A. PERRI.
LASTING MACHINE.
APPLICATION FILED NOV. 22, 1916.
1,260,034.
Patented Mar. 19, 1918.
8 SHEETS—SHEET 7.
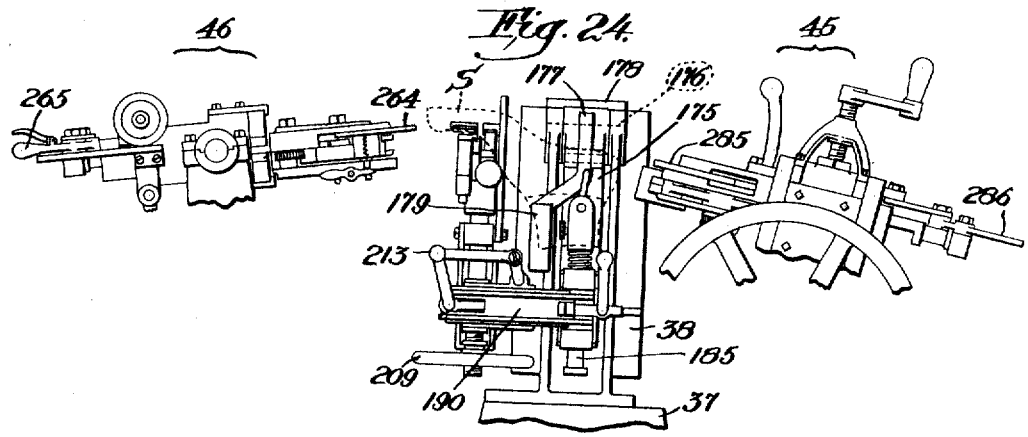
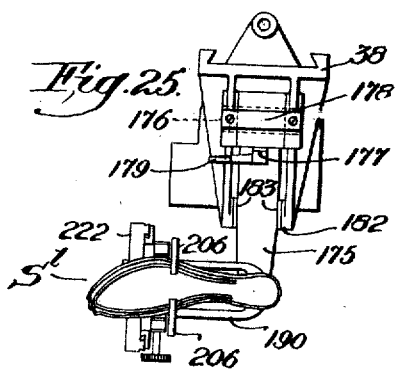
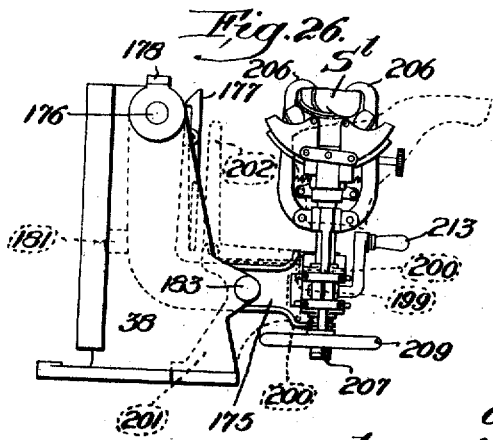
Inventor:
Angela Perri,
by Rogers, Kennedy & Campbell
his Attys.

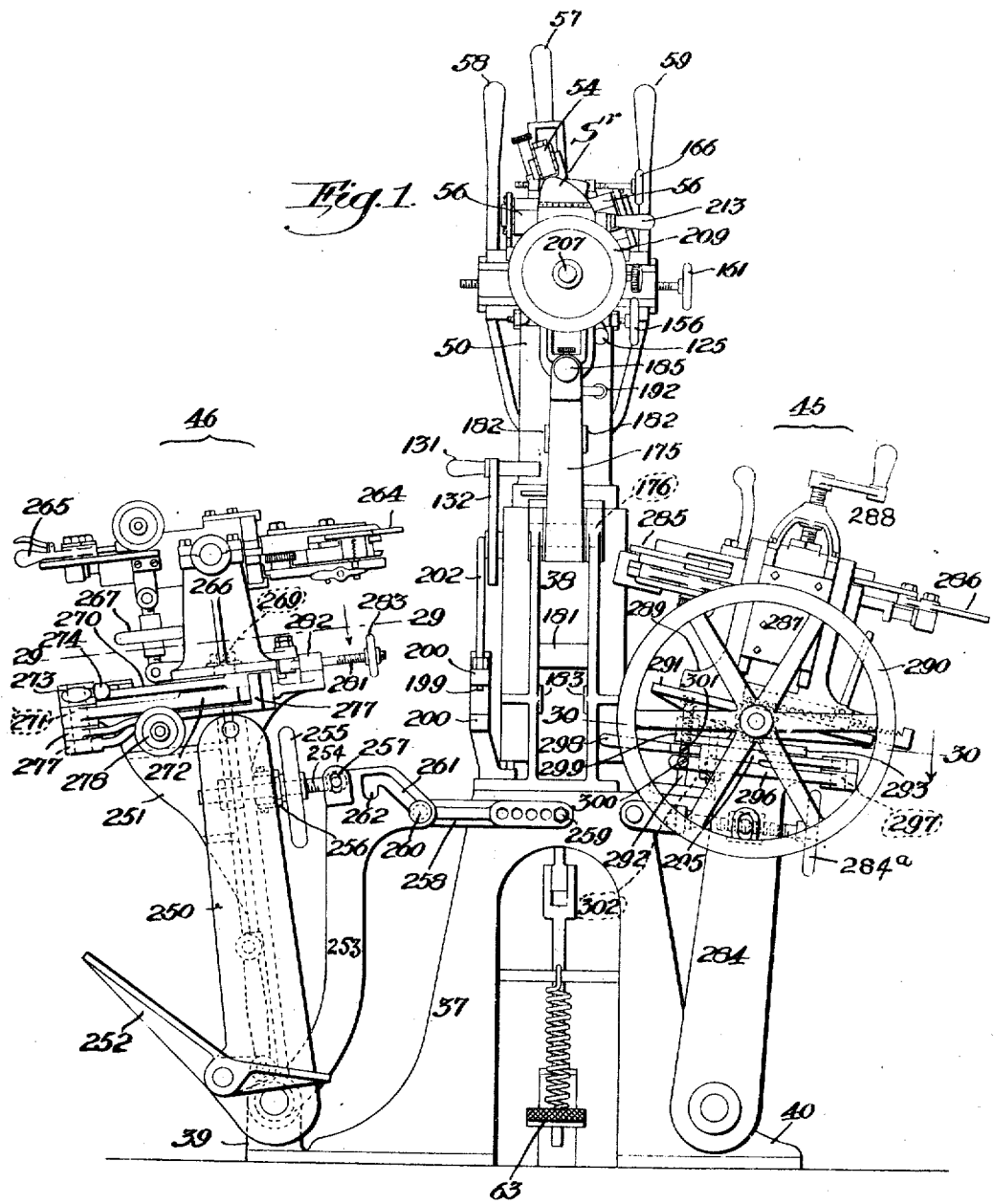

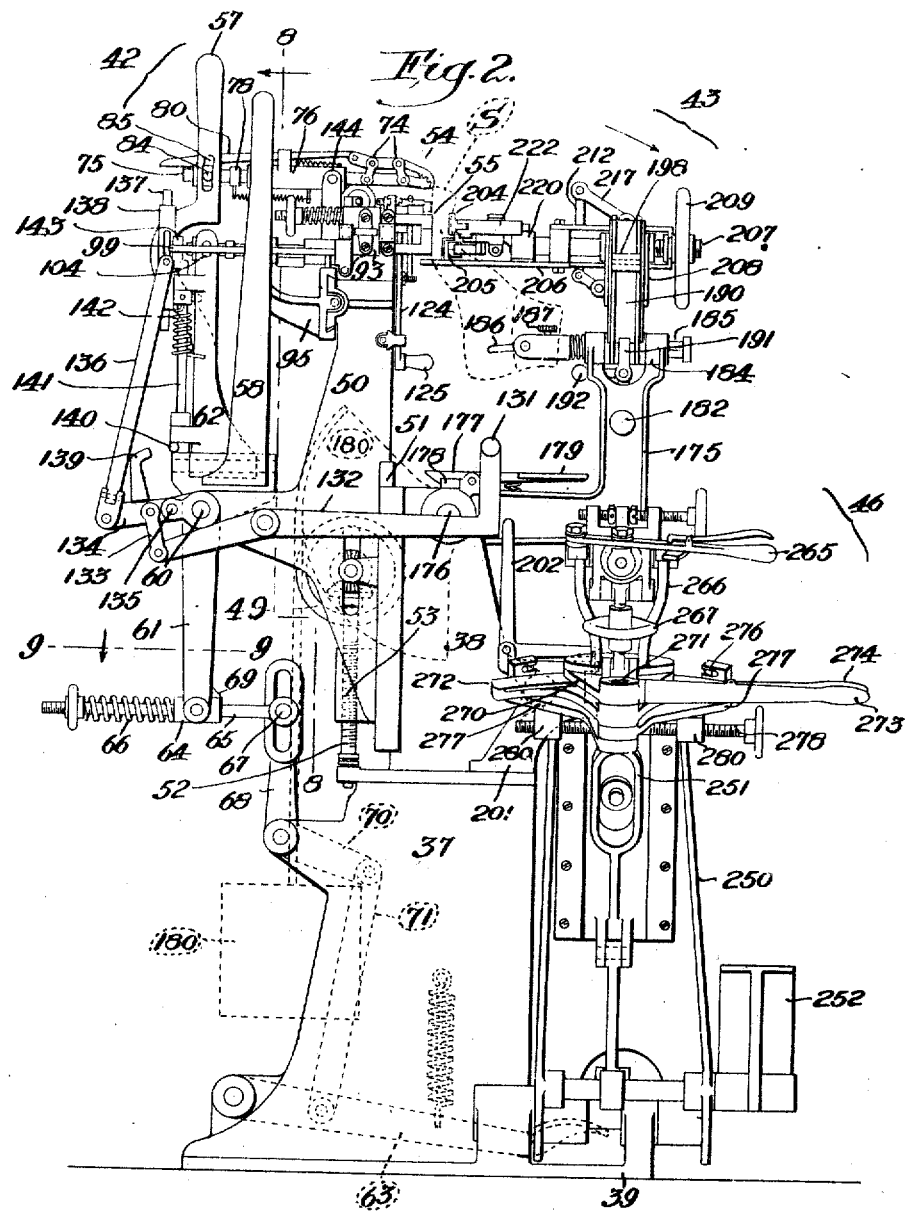

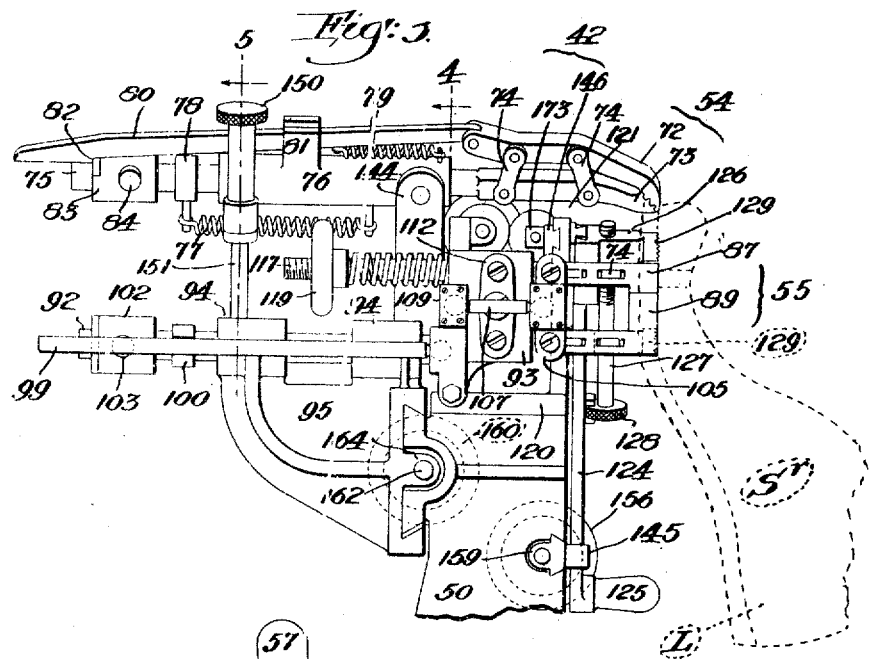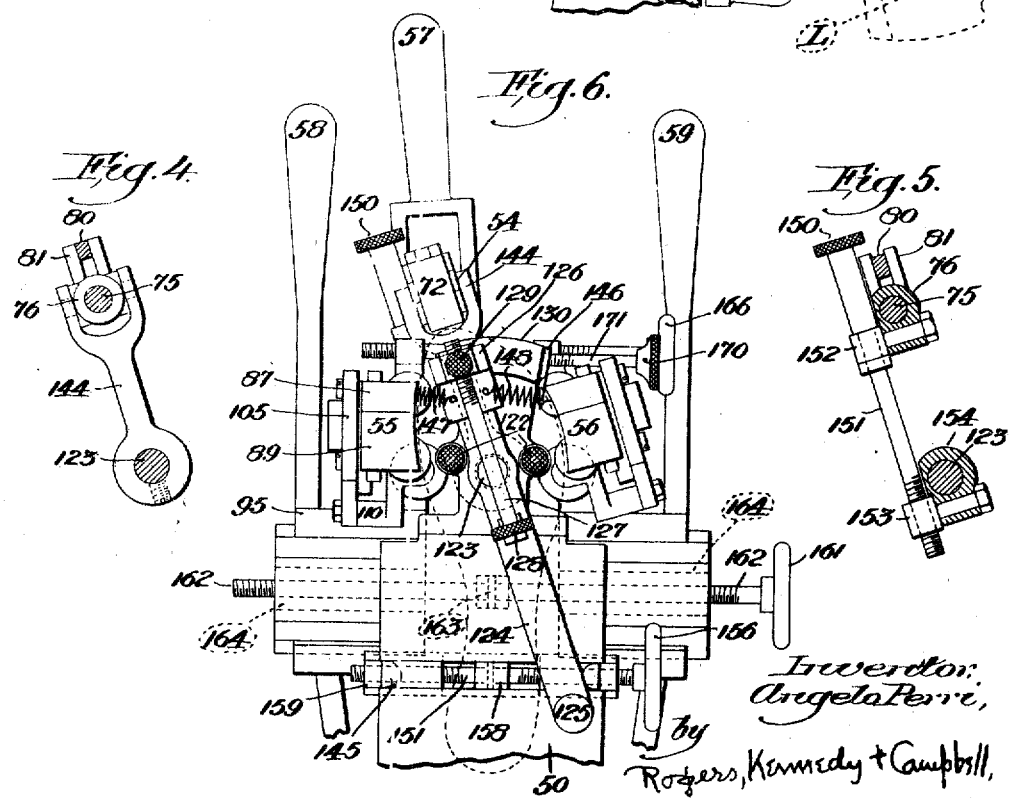

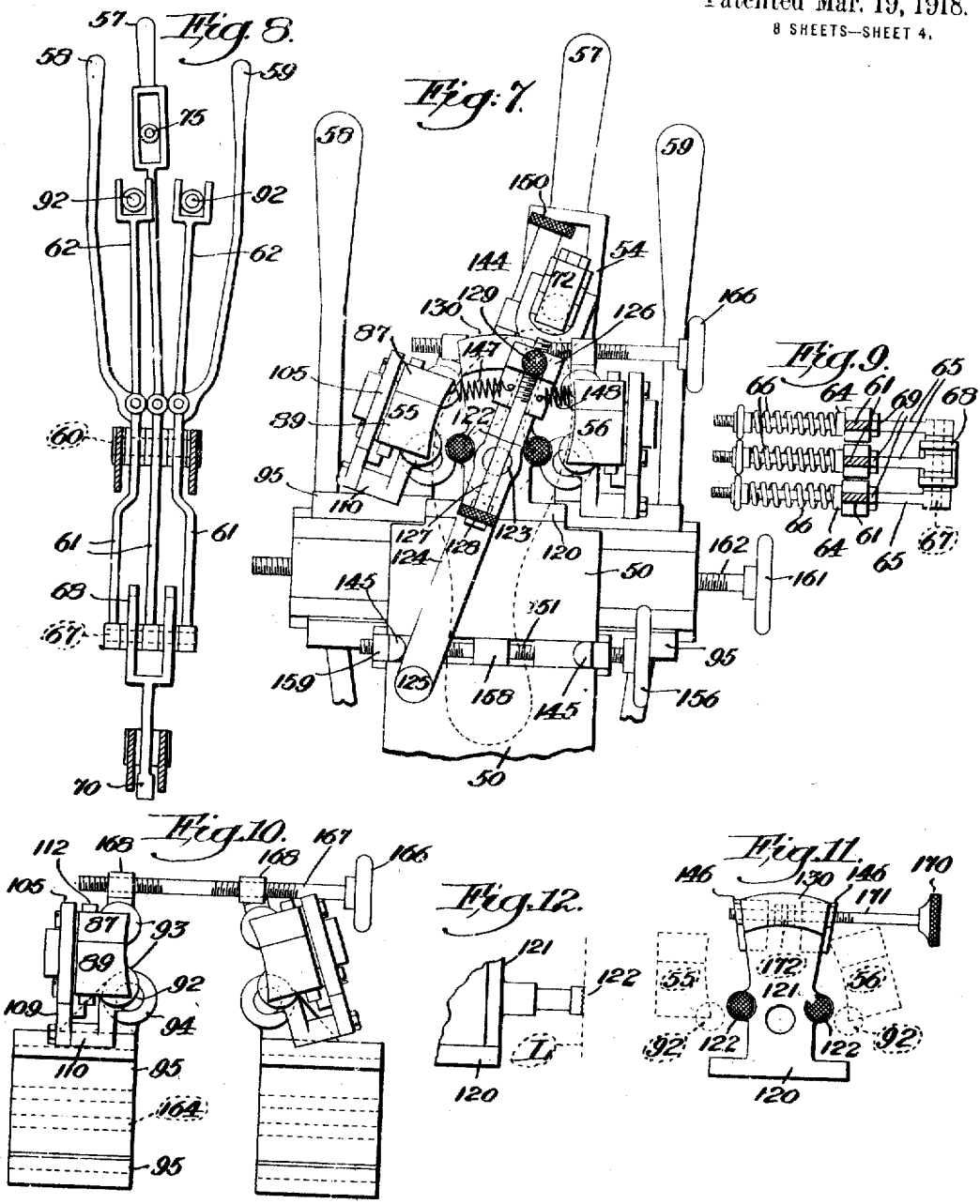

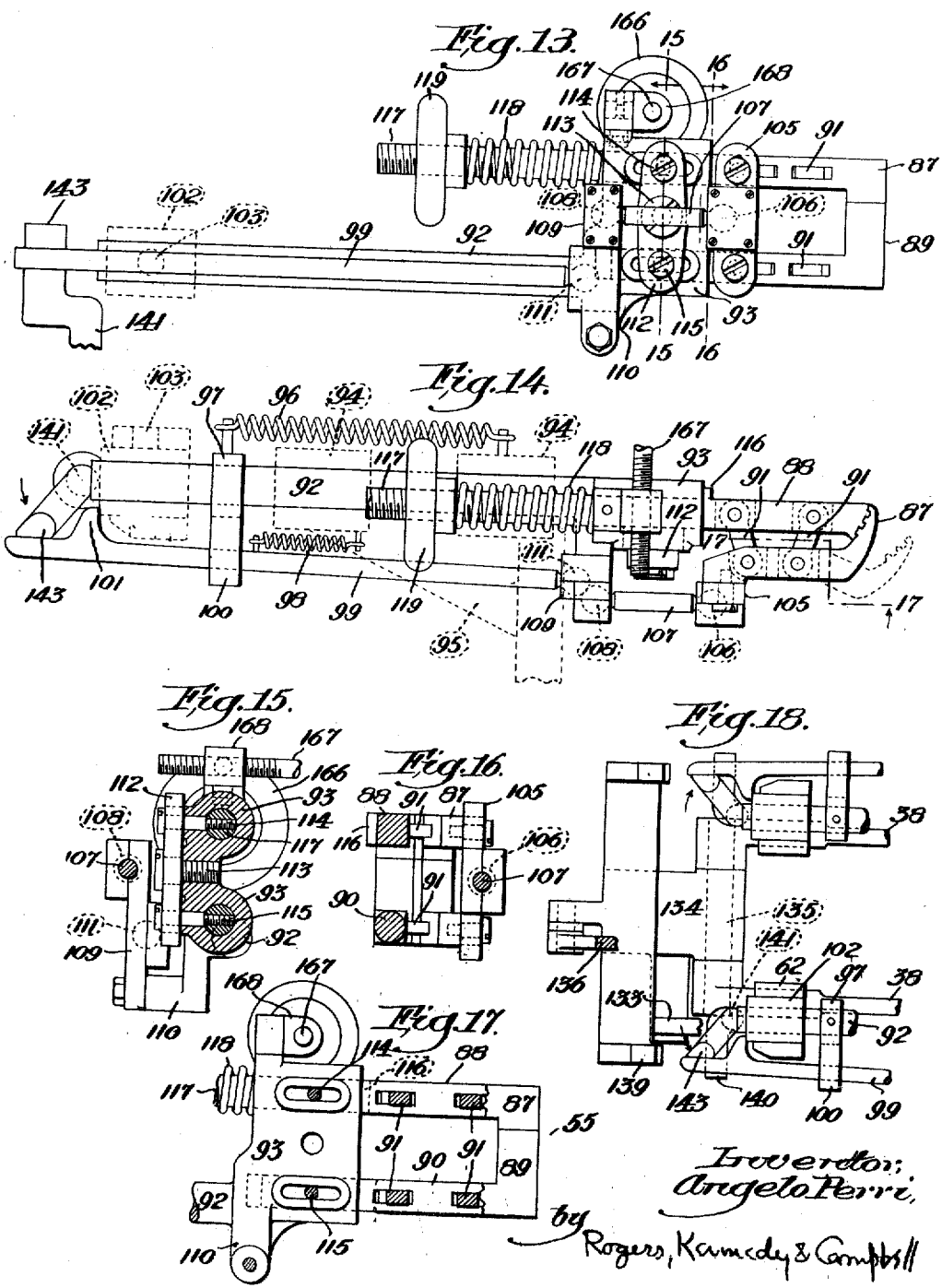

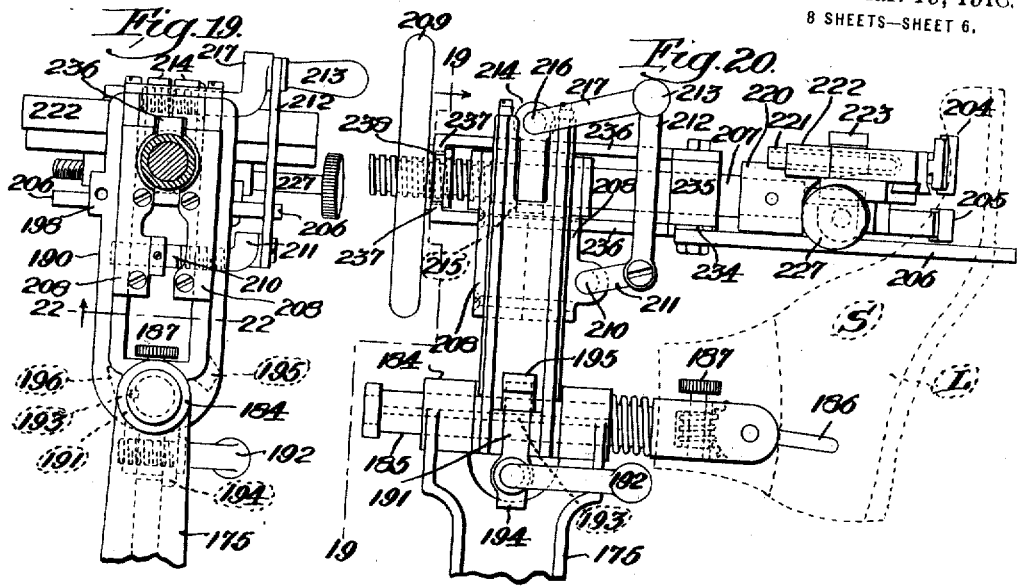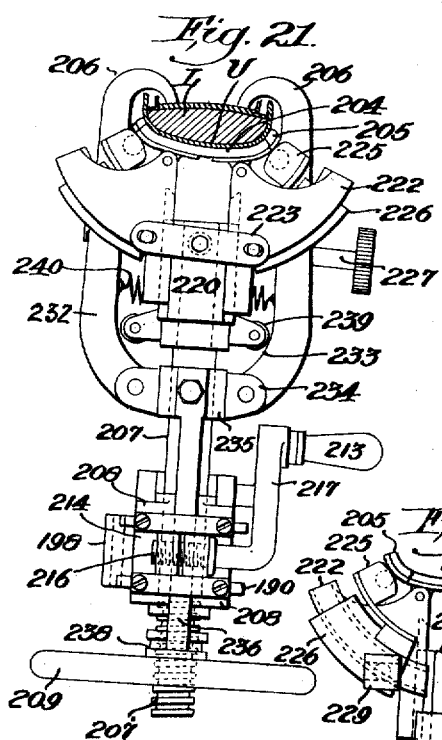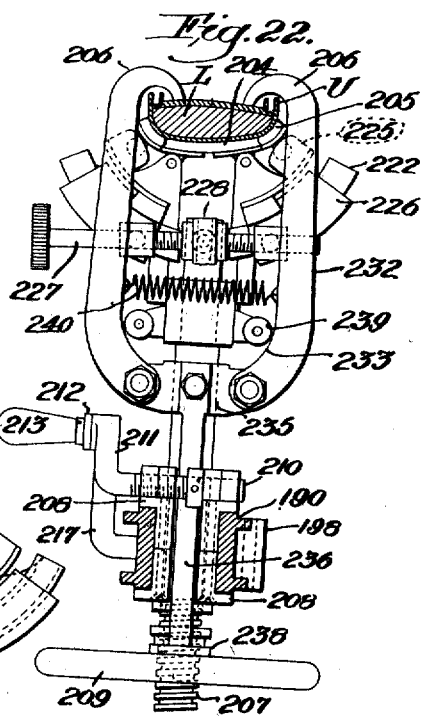

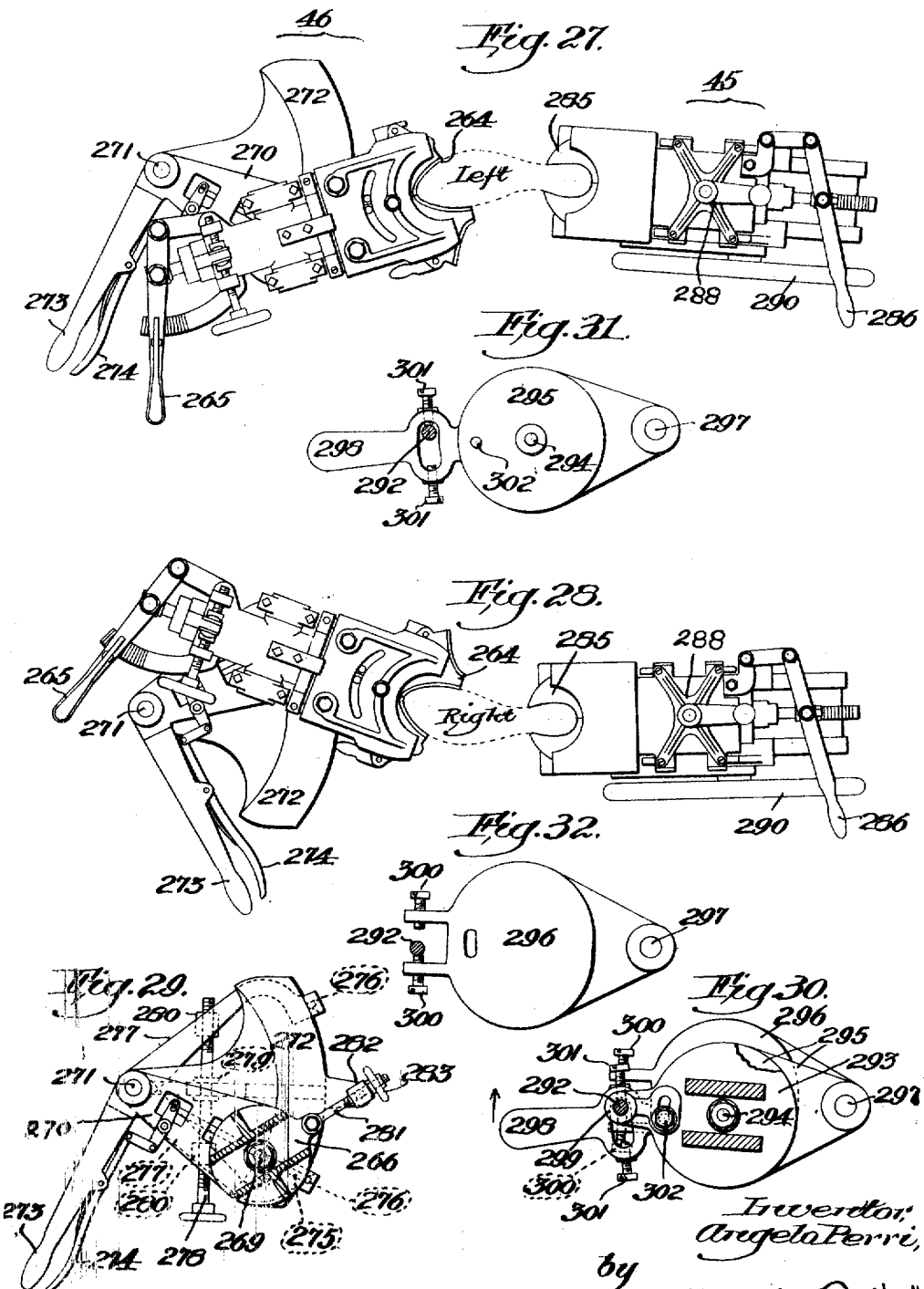

UNITED STATES PATENT OFFICE.

ANGELO PERRI, OF GROVELAND, MASSACHUSETTS, ASSIGNOR TO REECE SHOE MACHINERY COMPANY, OF BOSTON, MASSACHUSETTS, A CORPORATION OF MAINE.

LASTING-MACHINE.

1,260,034.

Specification of Letters Patent. Patented Mar. 19, 1918.

Application filed November 22, 1916. Serial No. 132,806.

*To all whom it may concern:*

Be it known that I, ANGELO PERRI, a citizen of the United States, residing at Groveland, in the county of Essex and State of Massachusetts, have invented certain new and useful Improvements in Lasting-Machines, of which the following is a specification, reference being had therein to the accompanying drawing.

This invention pertains to the art of shoe lasting and involves a novel shoe lasting machine. In the manufacture of shoes by various systems a sectional wooden last is usually employed to give form to the upper of the shoe. The lasting process is for the purpose of shaping the upper and assembling or securing it with the sole (insole or outsole) about the last as a form. An example of this type of machine is shown in my prior Patent No. 1,168,963, granted January 18, 1916, in which patent is fully pointed out the nature of the lasting operations. The first step is the "pulling-over" operation, by which the soft leather of the upper is pulled or stretched at the front and two sides near the toe so as to conform with the last. Following the pulling-over operation is the wiping operation, which consists is smoothing or wiping the margins of the upper about the last at the toe end of the shoe, and also at the heel end, and frequently at the sides or shanks of the shoe. The wiping operations are followed by securing the overhanging material in place by tacking, or by the use of wire or thread.

When the complete operations mentioned are performed in a single machine, as in my Patent 1,168,963, the machine comprises several coöperating mechanisms, namely, the so-called pulling-over mechanism, the toe lasting or wiping mechanism and the heel lasting or wiping mechanism. The side lasting or wiping may be performed by hand, or through simple implements which will not be illustrated or described herein.

The present machine, therefore, embodies a pulling-over mechanism, a toe wiping mechanism, a heel wiping mechanism and a shoe holding device or jack. Generally speaking, the relative arrangement of these mechanisms is similar to the disclosure in my Patent 1,168,963, although, as will herein appear, the coöperation between the several mechanisms is new and the principles of operation and structure of each of the mechanisms is novel.

One of the objects of the present invention is to afford a shiftable jack by which the shoe may be positioned, held and shifted between its pulling-over and wiping positions, in a more simple, advantageous and expeditious manner than heretofore, and in combination therewith pulling-over and wiping mechanisms adapted to coöperate with the shoe holding jack in its respective positions.

In my Patent 1,168,963 it was necessary after the pulling-over operation and after the inversion of the jack, to tilt the shoe into the horizontal and adjust it angularly to the wiping mechanism, prior to the toe and heel wiping operations, and it is an object hereof to dispense with this movement by affording the shoe an invariable position in the jack and therefore predetermined pulling-over and wiping positions, and so constructing the pulling-over and wiping mechanisms that they can all be readily adjusted or adapted to such position of the shoe.

A further object is to so construct the several mechanisms that, whether a right shoe or a left shoe be engaged in the jack in the given posture, the pulling-over and the wiping mechanisms are all capable of being readapted or reversed in a quick and advantageous manner for either shoe.

A further object is to afford a more advantageous structure and operation of pulling-over mechanism.

A further object of the present invention is to generally improve the construction and efficiency of the shoe holding means or jack and the devices contained therein for clamping the shoe in place.

The toe wiping mechanism, so far as the wiper plates and their actuating mechanism is concerned, are not herein claimed to be new and they may be of any desired type of structure. For convenience, I have herein illustrated toe wiper plate mechanism substantially the same as in my co-pending application Serial No. 119,415, filed September 11, 1916. It is an object, however, of the present invention to afford improved fittings by which the toe wiping mechanism or head may be adjusted and moved into and from operative position, and readily reversed for right or left shoes.

Similarly, also, while the heel wiper plates and their actuating means are not herein claimed to be new, the present invention provides a novel and advantageous structure of fittings whereby the heel wiping head may be adjusted or moved into and from operative relation with the shoe, and reversed for right and left shoes.

Other and further objects and advantages will appear during the hereinafter following description, and further advantages will be apparent to those skilled in the art.

To the attainment of the several objects and advantages, referred to the present invention consists in the novel machine, mechanisms, combinations, devices and arrangements herein illustrated, described or claimed.

By way of illustration I will first describe a lasting machine constructed in a manner to embody the present invention, and will thereafter point out the novel features in the appended claims.

In the accompanying drawings forming a part hereof, Figure 1 is a complete front elevation of a lasting machine embodying the present invention.

For convenience, the shoe will hereinafter be designated by the letter S, the shoe upper by U, and the last by L. Right and left shoes respectively will be designated S<sup>r</sup> and S<sup>1</sup>.

Fig. 2 is a left side elevation of the machine shown in Fig. 1, the heel wiping mechanism, which is behind the toe wiping mechanism, being omitted for clearness.

In Figs. 1 and 2 the parts are shown in their position after a right shoe has been secured in the clamp and after the upper has been pulled over by the pulling-over mechanism, but before the release of the shoe from the pulling-over mechanism and its shifting into wiping position.

Fig. 3 on a larger scale shows the pulling-over mechanism in the same view as in Fig. 2, working on a right shoe.

Figs. 4 and 5 are details taken respectively on sections 4—4 and 5—5 of Fig. 3.

Fig. 6 is a front elevation of the pulling-over mechanism shown in Fig. 3.

Fig. 7 is a similar view showing the parts reversed for a left shoe.

Fig. 8 is a partial front elevation or skeleton view of the pulling-over levers and their connections, this view being partly in section substantially on the general plane indicated at 8—8 in Fig. 2.

Fig. 9 is a plan view of a detail taken partly in section on the plane 9—9 of Fig. 2.

Fig. 10 is a detached front elevation of certain parts shown in Fig. 6 for illustrating the adjustment of the side grippers.

Fig. 11 is a similar view showing the adjustable stop devices for limiting the swing of the side grippers in changing over from their position for right shoes, as seen in Figs. 6 and 10, to their reversed position, as seen in Fig. 7, and vice versa.

Fig. 12 is a left elevation of the lower portion of Fig. 11.

Fig. 13 in enlarged left elevation shows the set of grippers at the left side.

Fig. 14 is a top plan view of the parts shown in Fig. 13.

Figs. 15, 16 and 17 are details taken on the indicated section lines of Figs. 13 and 14.

Fig. 18 is a partial plan view of the mechanism at the upper left hand side of Fig. 2 showing particularly the structure of the tripping devices for knocking off the grippers.

Fig. 19 is a front elevation showing a portion of the jack, illustrating particularly the shoe holding clamp, but with the clamp closing hand-wheel omitted.

Fig. 20 is a right elevation of the parts shown in Fig. 19.

Fig. 21 is a top plan view of the parts shown in Fig. 19. Fig. 22 is a bottom view of the same.

Fig. 23 is a detached bottom view showing a portion of the structure which is partly shown in Fig. 22.

Fig. 24 is a partial front view of the machine shown in Figs. 1 and 2, with the pulling-over and base portions omitted and the shoe holding jack swung downwardly and leftwardly so as to hold the shoe in its proper position for toe and heel wiping.

Fig. 25 is a top plan view of the jack as seen in Fig. 24.

Fig. 26 is a left elevation of the parts shown in Fig. 25, the shoe also being shown in dotted lines in its intermediate position after being swung down and before being swung to the left.

Fig. 27 is a top plan view of the mechanism shown in Fig. 24 adjusted for end wiping operations on a left shoe.

Fig. 28 is a similar view showing the mechanisms reversed for a right shoe.

Fig. 29 is a partial plan view of the toe wiping mechanism, taken partly in section on the plane 29—29 of Fig. 1.

Fig. 30 is a similar view of part of the heel wiping mechanism, taken on the plane 30—30 of Fig. 1.

Figs. 31 and 32 show in detached view certain parts of Fig. 30.

The several component mechanisms which together make up the complete machine are shown in a general way in their coöperative relations in the assembled views, Figs. 1, 2, 24, 27 and 28. The relative arrangement of the several mechanisms will first be described, and subsequently the structure and operation of the respective mechanisms will be separately described, and finally the operation of the machine as a whole showing the coöperative action of the several mechanisms. It is to be understood, however, that the several mechanisms are each claimed to be novel *per se* and capable of advantageous employment in different combinations and relations from that shown in the drawings.

The machine and its operation are such that the operator may stand in place throughout the lasting process on each shoe, namely, in a position directly in front of the machine facing its middle portion, from which he may reach by hand or foot the various controlling, adjusting and operating levers, wheels and the like.

The main frame, or body, or base, 37, of the machine is shown as provided with an upstanding bracket 38, which supports the pulling-over mechanism. At the left and right ends of the base are shown extensions 39 and 40, above which are supported the toe and heel wiping mechanisms respectively. The general location of the shoe holding jack is between the toe and heel wiping heads and beneath and forward of the gripper devices of the pulling-over mechanism, as clearly indicated in the figures mentioned. The pulling-over mechanism 42 stands somewhat to the rear of the other mechanisms although its operating handles are within reach.

The jack mechanism 43 is, as in my Patent 1,168,963, capable of effecting a shifting of the position of the shoe after the pulling-over operation and before the wiping operations. Preferably, the heel wiping mechanism 45 is to the right and the toe wiping mechanism 46 to the left of the position of the jack. Unlike said prior patent, the present machine requires only two shiftings of the shoe between its initial and final positions, and, also unlike said prior patent, the shifting of the shoe in the present machine involves a substantial change of location thereof.

In using the noun "position" herein with reference to the shoe I intend to refer either to the posture of the shoe, or its location. When I refer to the shifting of the shoe, or shifting its position, without stating specifically whether this involves a change of posture or change of location, I mean a shifting either of posture or of location, or both.

The initial position of the shoe, as in Figs. 1, 2, 3, 6, 7 and 20, is that in which the last is shown as standing substantially upright with the toe end on top and the sole or bottom of the last facing rearwardly from the operator. The initial location of the shoe will be observed to be at a higher level than the final location, in which the wiping is performed, so that, when the shoe is shifted during operations, it is brought from a higher to a lower level, this being permitted by the advantageous structure of jack, which will be described. This machine is unlike my prior patent in this respect, and permits the shoe to be held at the higher level during the pulling-over, which is more convenient and advantageous for the operator, whose convenience is further enhanced by the vertical or upright posture of the shoe in its initial or pulling-over position.

The final or end wiping position of the shoe is as shown in Figs. 24 to 28, the shoe being inverted and the forepart of the last being substantially horizontal, with the toe end at the left and the heel at the right.

As before stated, there is an intermediate position of the shoe at which it may rest momentarily during its shifting, this being shown in dotted lines in Fig. 26, the last being at this time horizontal, but the shoe standing at right angles to its final position, with the toe toward the operator. As thus described, the jack permits two shifts of the shoe, the first shift being from the pulling-over position, with a forward and downward swinging motion, to the intermediate position, in which the toe points toward the operator, as just described. While in this position, if desired, the side lasting operations may be performed. The second shift is about a vertical axis which may be located near the heel end of the shoe, so that the toe end will be swung around leftward into the described final position.

I propose that the shoe or the jack shall be locked in its initial and final positions, if desired, although in some cases the pulling-over and wiping mechanisms themselves will sufficiently hold the shoe in place.

Instead of shifting the shoe to a temporary or intermediate position, as just described, the two shiftings may be combined into a single shift of a compound nature, so that, either by hand or by simple automatic mechanical connections, the swinging forwardly and downwardly of the shoe will be accompanied by a swinging to the left, so that the operator by a single motion causes the shift of the shoe from initial to final position.

As before stated, I dispense in this machine with the necessity of any tilting or swing of the shoe with respect to the jack, as was necessary in my Patent 1,168,963, and therefore, as will appear more clearly in describing the jack, I prefer that there should be no movement or adjustment whatever of the shoe in the jack after it is once clamped, other than leftward swing of the shoe and clamp already mentioned. In fact, I propose to locate the shoe in the jack, not by the clamp at the toe end, but by means of a spindle entering the spindle hole in the last near the heel. This spindle, being a rigid part of the jack, gives the shoe a definite longitudinal position in the jack and serves, moreover, to hold the shoe more rigidly and against accidental displacement, not merely during the pulling-over, but during the subsequent wiping operations.

Owing to the described shoe shifting movements, and the nature of the jack by which the movements are accomplished, and because of the extensive variations in size and style of shoes, as well as the difference between the rights and lefts, I have provided that the pulling-over and wiping mechanisms shall be themselves adjustable to adapt them to the substantially predetermined initial and final positions respectively of the shoes, whether right or left, or whatever the style or size. However, instead of vertical adjustment of the pulling-over mechanism to meet variations of lengths of shoes positioned in the jack by their heel ends, I propose, as a modification sometimes desirable, to arrange for adjustment vertically in the jack of the heel spindle to meet differences in positions of the shoes, caused by setting the toe apexes to a height in relation to the pulling-over devices, which latter in that case need not be vertically adjustable.

Coming now to the pulling-over mechanism 42 and referring more particularly to Figs. 1 and 2, the shoe S is shown as having been clamped in place in the jack after the pulling-over operation, but before the release from the grippers. The shoe is supposed to have been first engaged upon the last spindle and brought into suitable position with relation to the pulling-over grippers; the pulling-over then being performed and the jack clamp being subsequently applied, since the clamp, if applied previously to the pulling-over, would interfere with the accuracy of the operation.

Owing to the variations in size of shoes, the pulling-over mechanism as a whole must be adjustable upwardly and downwardly. Owing to changes in width and contour the grippers at the toe and at the two sides must be relatively adjustable. Finally, owing to the desirability of operating successively on rights and lefts, the pulling-over mechanism must be quickly and easily reversible symmetrically, which reversing operation is completely performed herein by a single manual adjusting operation.

For the purpose of vertical adjustment of the pulling-over mechanism to accommodate it to a vertically, non-adjustable shoe, the mechanism may be bodily mounted on a rising and falling support 50, connected by a dovetail sliding device 51 with the stationary bracket 38 before mentioned. The vertical adjustment may be performed by means of a threaded vertical shaft 52 engaging a threaded lug 53 on the support 50, a hand wheel 49 being arranged for turning the shaft to secure the desired adjustment.

The details of the gripper mechanism are indicated in Figs. 1 and 2 and shown more clearly in Figs. 3 to 18.

A gripper 54 is shown located at the apex of the toe of the shoe, and in addition to this there is a gripper 55 at the left and a gripper 56 at the right. Each of the side grippers is double in construction, the two parts being actuated in conjunction through an equalizing device that gives a small amount of play, so that each side gripper, which is of comparatively extended length, may adapt itself more efficiently to irregularities in the pulling-over operation.

The gripper mechanism is universal in character, having a number of adjustments for adapting the grippers to the various lengths and shapes of shoes, and in operation the grippers are controllable to suit the will and judgment of the operator by means of a plurality of separate operating handles for the respective grippers and a single lever or pedal for effecting their conjoint operation, so that in a well-known manner the operator, while carefully observing the effect upon the shoe upper, may manipulate the levers to secure perfect pulling-over results.

Before describing the details of the grippers and their connections to their operating levers, I will point out the latter and the operating pedal. At the top of the machine is the operating lever 57, which, when thrown rearwardly, serves to first close and then pull the toe gripper 54. At the left is the hand lever 58, which is thrown rearwardly to close and pull the left gripper 55. Similarly on the right the hand lever 59 is connected for closing and operating the right side gripper 56. The three hand levers 57, 58, 59 are all fulcrumed at their lower ends on a stud or shaft 60, and each one of them below the fulcrum is provided with a downwardly extending arm 61. The hand levers 58 and 59 are rigid with their respective downwardly extending arms 61, as seen in Figs. 2 and 8. The hand lever 57, however, is capable of swinging laterally by reason of a pivot connection located somewhat above the fulcrum 60. This is for the purpose of permitting the hand lever to accommodate itself to changes of lateral adjustment of the toe gripper. Also, each of the side hand levers has connected with it a pivoted arm 62 extending upwardly from near the fulcrum 60 and capable of lateral swinging for accommodation to lateral adjustment of the side grippers.

It will thus be seen that each of the three hand levers may be thrown rearwardly for causing the pulling operation, while at the same time lateral play is permitted for the lateral adjustment mentioned.

In order to permit the apex and the two sides of the extending shoe upper to be pulled simultaneously, I provide a lever or pedal 63 having connections for causing the simultaneous throwing of the three hand levers 57, 58, 59. The downwardly extending arms 61 of the hand levers are provided for this purpose. Each at its lower end has pivoted to it a short hub or guide 64, and through these three guides slide three horizontal rods 65. Each rod and hub is provided with a fairly strong spring 66 tending to maintain them in normal longitudinal relation, but capable of yielding to permit independent movement of the hand levers. The three rods 65 at their forward ends are all pivoted to a cross stud 67, which in turn engages with a vertically slotted lever arm 68, by which the three rods and the three arms 61 may be pulled forwardly to simultaneously throw the three hand levers rearwardly.

The slot in the arm 68 is to accommodate the structure to the before described changes in vertical adjustment of the pulling-over mechanism. The stud 67 moves up and down in a slot in the lever arm. It is prevented from rising excessively by a stop 69 interposed between one of the arms 61 and one of the guides 64. The stud 67 is prevented from dropping by the excessive weight of the parts at the other ends of the rods 65.

The lever arm 68 is connected to the pedal 63 through a forward extension 70 of the arm and a link 71.

By the described connections, when the pedal 63 is depressed, the three hand levers are simultaneously thrown rearward, to cause the pulling operation by all of the grippers, this operation being cushioned by the springs 66 to prevent excessive pull and injury upon any part of the upper. At the completion of the pedal pulling operation any one or more of the three hand levers may be separately manipulated to correct any inequalities in the operation. When the operator is satisfied with the work he may apply the jack clamp to the shoe toe, and then operate a device, which will be later described, to throw open all of the grippers, thus releasing the shoe and jack for shifting to the wiping position.

I will refer now to the toe gripper 54 and its operative connections by which it is closed and retracted upon the rearward movement of the hand lever 57. The gripper comprises an outer jaw 72 and an inner jaw 73, which are connected and movable in a novel manner for opening and closing. A pair of non-parallel links 74 are shown, each extending from one jaw to the other in such a way that, when the outer jaw 72 is advanced, it simultaneously swings from the inner jaw, thus quickly giving a wide opening movement. The nature of this movement is indicated in connection with the similar side gripper, Fig. 14. In addition to the jaw opening and closing movements, the gripper is capable of a bodily advancing and retracting movement, and to permit this the shank 75 of the inner jaw is slidingly fitted in a sleeve 76, which, although adjustable, is normally stationary. In the figures referred to the gripper has been retracted bodily against the resistance of a stout spring 77, which normally maintains the gripper in its advanced position. A collar 78 on the shank 75 contacts with the sleeve 76 for determining the normal advanced position of the gripper.

The outer gripper jaw 72, although shown in its closed and retracted position, is normally advanced and the jaw open, and a spring 79 is provided tending to move the jaw forwardly and thus cause its opening.

For closing the toe gripper and pulling it rearward the outer jaw 72 is provided with a pivoted extension or tail 80. The spring 79, before referred to, extends between the tail 80 and the sleeve 76 and serves not merely to press the jaw 72 forward, but to hold the tail 80 down in its proper position, as shown in Fig. 3. A pair of ears 81 upstanding from the sleeve 76 form a convenient recess or guide for the middle portion of the tail piece 80.

It is obvious now that, if tail 80 be pulled rearwardly against the tension of spring 79, the first result would be to close the gripper jaw 72, and thereafter to bodily retract the toe gripper against the tension of spring 77.

For the purpose of performing this movement tail 80 is provided with a notch or shoulder at 82 adapted to be hooked or engaged over the corner of a block 83, which is adapted to slide freely along the gripper shank 75. This block is provided with a pair of laterally extending pins 84, which, as seen in Fig. 2, engage in curved slots formed at 85 in the central hand lever 57. Thus, when the hand lever 57 is thrown rearwardly, either by hand or foot power, the result is to first close the toe gripper upon the previously positioned shoe upper, and then pull the same rearwardly, stretching it over the last. After the pulling-over operation is complete, the knocking-off devices hereinafter referred to come into play to throw upwardly the rear extremity of the gripper tail 80, so as to disengage its shoulder 82 from the block 83, and thereby permit the spring 77 to act to advance and open the outer jaw, without advancing the inner jaw.

The side grippers 55 and 56 are substantially symmetrical duplicates of each other, and it will be sufficient to describe the left side gripper 55. In general principles it is similar to the toe gripper, the chief difference lying in the fact that the side gripper is double, having in reality two independent pairs of gripping jaws, between which and the pulling connections is an equalizing device. The upper portion of the side gripper is located to approximately correspond with the rear edge of the shoe toe cap, and the lower side gripper portion is arranged directly alongside of the other and is of greater longitudinal extent. Each portion of the side gripper is composed of an outer and an inner jaw, similar to the outer and inner jaws 72, 73 of the toe gripper.

Thus, there is an outer upper jaw 87 cooperating with an inner upper jaw 88, and beneath these are the lower outer jaw 89 and the lower inner jaw 90. Each outer jaw is connected to the inner jaw through a pair of non-parallel links 91, as best seen in Fig. 14, this arrangement being similar to the links 74 of the toe gripper.

Also, there is a rearwardly and forwardly sliding shank 92 analogous to the shank 75 of the toe gripper. The shank 92, however, is not directly connected with the inner jaws 88 and 90, but is provided with an enlarged head 93 of a generally square form, on which the connections below to be described are mounted.

Suitable bearing sleeves 94 are provided for the sliding movements of the shank 92, and these bearings are normally stationary, being formed at the upper part of a support or carriage 95, having a horizontal dovetail connection with the rising and falling support 50 for purposes of adjustment, as will be later explained.

The shank 92 is constantly pulled forward by a spring 96, like the spring 77 of the toe gripper. The spring 96 extends between a collar 97 on the shank and one of the bearing sleeves 94. There is also a spring 98 corresponding to the spring 79 for the purpose of moving forwardly and opening the outer gripper jaws. This spring acts upon a forwardly and rearwardly extending bar 99, which may be termed the tail of the side gripper, it corresponding generally with the tail 80 of the toe gripper. When the tail 99 is pulled rearwardly, its operation, as will be later described, is to first indirectly cause a pull upon the outer jaws 87 and 89 to close the side grippers, and then a forcible pull on the entire side gripper device. The tail 99 is suitably confined by a pair of ears 100 formed on the collar 97. In order to enable the tail 99 to be pulled rearwardly for the purposes described, it is provided near its rear end with a projection or hook 101, analogous to the notch 82 of the toe gripper tail. This hook is adapted to be engaged by a block 102, mounted for convenience loosely upon the gripper shank 92. The block is provided with oppositely extending pins 103, which are engaged by elongated slots 104, formed in the upstanding arm 62 connected to the hand lever 58. Thus, when the hand lever 58 is thrown rearwardly, it operates to force the block 102 rearwardly, the block engaging the hook 101 and pulling the gripper tail 99 rearwardly to close and actuate the grippers as described.

As before stated, the sliding shank 92 and the operating bar or tail 99 are not connected directly to the gripping jaws in the simple manner that is employed for the toe gripper, but the connections are complicated somewhat by the need of equalizing devices to permit the upper jaws of the side gripper and its lower jaws to work or pull the leather in different amounts.

Referring particularly to Figs. 13 and 14, the two outer jaw members 87 and 89 are shown as connected by a transversely extending equalizing bar 105, which at its ends has slotted pivoted connections to the two jaws, and at its middle portion has ball-and-socket device 106 connected by link 107 with a ball-and-socket device 108 formed at the swinging extremity of a lever 109 fulcrumed at its lower end to an extension 110 of the head 93. This lever 109 is provided with a ball-and-socket device 111 connecting it with the rearwardly extending bar or tail 99.

When the tail 99 is pulled rearwardly, or to the left, in Figs. 13 and 14, it swings the lever 109 and thus pulls the equalizing lever 105, which in turn pulls upon and causes the closing of both of the outer gripper jaws 87 and 89. After the jaws are closed upon the work and the actual pulling commences, the equalizing lever admits of the relative movement, before referred to, of the upper and lower jaws.

The need of this relative movement may be explained as follows. As before stated, the upper jaw members 87 and 88 are located substantially at the rear of the toe cap. At this point there is a seam across the upper which presents two thicknesses of leather. It would not be desirable to pull over this portion of the upper to any great extent. The portion of the upper to the rear of this point, however, contains no extra thickness of leather and is required to be pulled to a greater extent to properly shape the upper to the last. I have above described the equalizing lever that permits this differential gripper motion so far as the outer jaws are concerned, and I will now describe an analogous equalizing device for the inner jaws.

An equalizing lever 112 is centrally pivoted transversely on the head 93 by means of a stud 113. The two ends of the lever 112 are connected respectively to the shank portions of the inner jaw members 88 and 90 through studs 114 and 115, respectively, which extend through elongated slots formed in the head for that purpose. See Figs. 13 and 15.

The described equalizing device must be controlled in suitable manner, as otherwise the pulling would take effect solely on the thinner, lighter part of the stock which is gripped by the jaws 89 and 90. I, therefore, provide the following devices adapted to insure the proper pulling-over action by the upper gripper jaws 87 and 88, and at the same time to yieldingly permit the relative movement before described, so that the jaws 89 and 90 may properly perform their work.

The inner gripper jaws 88 and 90 are both slidingly fitted in the forward end of the head 93. For purposes that will appear a stop 116 is provided on the gripper jaw 88 forward of the head 93 such that, when the stop is brought into contact with the head, the gripper jaws 88 and 90 stand in their proper normal relative position with the equalizing lever 112 in the position shown in Fig. 13. It will be noticed that this stop device is not such as to prevent the lower gripper jaws operating to a greater extent than the upper. The upper jaw 88 is extended at the rear through the head for a suitable extent in the form of a rod 117, which accommodates a helical spring 118 confined by a threaded adjustable nut 119 on the rod 117. This spring 118 will be seen to pull rearwardly on the upper inner gripper jaw 88, tending thereby to maintain the jaws 88 and 89 in their before mentioned normal position, in which the stop 116 abuts against the head 93. The purpose of the spring 118 is not merely to hold the jaws normally in this position and to return them to this position after the pulling operation, but also to insure the proper degree of pulling-over by the upper jaws 87, 88. If we should consider the spring as removed and the two jaws and equalizing lever 112 unrestrained during the pulling operation, it is clear that the lower jaws, which are working on the softer, more elastic part of the stock, might be caused to operate to an excessive extent to the injury of the shoe, while the upper jaws on the contrary would operate to an insufficient extent, thus increasing the imperfection and deformation of the leather. If, on the other hand, we suppose the spring to be of infinite strength, then there would be no relative movement as between the upper and lower jaws, and the desired differential action in pulling-over would be secured. By turning the adjusting nut 119 to compress the spring 118 more or less, a point can be arrived at by experience and experiment where the upper and lower gripper jaws will perform their pulling operations in the desired proportion or relation.

The general operation of the left side gripper mechanism, whether actuated by the hand lever 58 or by the pedal 63, may be substantially as follows. The gripper tail 99 is pulled rearwardly by the collar 102. This, through the lever 109, link 107 and equalizing lever 105 draws the outer members of the upper grippers rearwardly, thus closing them upon the margin of the upper. The inner jaws 88, 90 are yieldingly held forward during this closing operation by the spring 96.

The continued rearward movement of the tail piece 99 compels all the gripper jaws to move rearwardly, thus pulling on the stock. This rearward movement is accompanied by the rearward motion of the gripper shank 92 and its head 93. In fact, all of the devices connected with the gripper head 93 move bodily rearward. As the pulling proceeds it is understood that, notwithstanding the bodily rearward movement of the several devices, a relative movement is permissible as between the upper jaws and the lower jaws. The lower jaws, working on the more stretchable material, tend to pull farther than the upper jaws, thus tending to swing the equalizing lever 112, and thereby to compress the spring 118. This tendency, however, is overcome to the proper extent by the reverse tendency provided by the spring, which partly resists the attempt of the lower jaws to move in advance of the upper jaws. The spring, however, being properly adjusted, a certain extent of pulling is accomplished by the upper jaws. At the completion of the pulling-over movement all of the described parts will stand to the rear of their normal position, the equalizing lever 112 will be slightly inclined, the spring 118 under an increased compression and the upper gripper jaws and stop 116 slightly forward of their normal position relative to the head 93. Subsequently when the gripper is disengaged from the shoe and the parts become restored to their initial position, the spring 118 serves to again center the equalizing lever 112 and bring the upper and lower gripper jaws into alinement.

Before describing the devices for releasing the work from the grippers, and the devices for effecting a symmetrical reversal of the pulling-over mechanism to change from right to left shoes, and vice versa, and the various adjusting devices, I will refer to a shoe rest or support which is provided in connection with the pulling-over mechanism, against which the sole of the shoe may bear and which will take the brunt of the pulling-over force.

Mounted on top of the rising and falling support 50, and therefore adjustable with it for variations in the length of shoes, is a bracket 120 having base flanges, by which it is secured to the support 50, and a central upstanding portion 121, as best seen in Figs. 3, 6 and 11. About halfway up the bracket are a pair of forwardly extending shoe supporting pins 122, which are roughened in any suitable way at their extremities so as to give a better hold against the sole of the shoe being operated on. The pins 122 stand forwardly to such an extent that, when contacting the shoe sole, the shoe and last will rest in the position indicated in Fig. 3. See Fig. 12.

Between the pins 122 the bracket 120 is recessed for the accommodation of a rock shaft 123, which at its forward end carries a swinging lever arm 124, the lower end of which is provided with a handle 125 for reversing purposes. The lever 124 where it extends above the rock shaft has fitted to it a block 126, capable of being adjusted lengthwise on the lever by means of a threaded shaft 127, provided with a knurled head 128. As seen in Fig. 3, the block 126 stands forwardly, and at its front end it is provided with a roughened circular piece 129, analogous to the heads of the pins 122 and adapted for the same purposes, namely, to give support to the shoe during the pulling-over.

These three supporting devices 122, 122, and 129 are shown in Figs. 6 and 7 in their proper positions for right and left shoes respectively, while Fig. 3 indicates the relation of the shoe thereto. It will be noticed also from these figures that the upper portion of the bracket 120 is provided with a smooth curved surface 130, which is contacted by the rear side of the lever 124 and receives the rearward thrust created by the pulling-over operation.

As has been before explained, when the shoe is first put into the machine, the last is engaged with the spindle of the jack, and the bottom of the shoe is at the same time laid against the shoe rest surfaces 122, 129, which support the shoe during the adjusting operations and during the pulling-over and during the application of the jack clamp to the shoe. After the pulling grippers have released the shoe, the latter with the jack is shifted out of contact with the shoe support surfaces 122, 129.

In order to permit the several grippers to be opened to release the work while they still remain held in their rearward position by the foot lever 63, I prefer to provide a mechanism for tripping or unlocking the several gripper tails 80, 99, by throwing them out of engagement with their operating blocks 83 and 102, respectively. For this purpose I have provided a single handle 131 formed at the forward end of a lever 132, whose rearward arm is connected by a link 133 with a second rearwardly extending lever 134, mounted on rock shaft 135, as shown in Fig. 2. See also Fig. 18.

For tripping or lifting the tail 80 of the toe gripper, there is shown a link 136 extending from the lever 134 to a vertically sliding trip rod 137, suitably mounted in a sleeve 138 formed or attached to the hand lever 57. By this arrangement the rod 137 is always directly beneath the rear end of the tail 80, so that, when lifted, it is capable of lifting the tail out of engagement with the block 83. By this arrangement a quick throwing-down of the handle 131 will lift the rod 137 and accomplish the desired purpose. The lifting movement is sufficient to allow for any changes of adjustment which may vary the height of the tail 80.

In order to analogously trip and release the side grippers, the rock lever 134 is provided with a pair of horns 139 located in such position that, when the lever is lifted, the horns will contact and actuate rocking pins 140, each of which is mounted on an upright rock shaft 141, which is normally held in the position shown in the figures by spring 142. At the top end of the rock shaft is a rocker or offset portion 143, so shaped and located that, when it is swung, it engages and forces outwardly the tail 99 of the side gripper. See Fig. 18.

Thus, when the releasing lever 131 is thrown downwardly, the several gripper tails 80, 99, are tripped and the springs 79 and 98, respectively, come into operation to thrust forwardly the gripper tails, thereby causing all of the outer gripper jaws to relatively advance and swing wide open. This effects the release of the work, and permits the shoe to be shifted, before the foot lever is raised.

I will now describe the mode of reversal of the pulling-over mechanism to adapt it from left to right shoes, and vice versa. As before explained, it is desirable that the reversal shall be easily and quickly accomplished, so as to facilitate the process of lasting in which the two shoes of a pair are successively lasted in order to secure better uniformity in the product. The fore part of shoes depart from straightness in varying amounts. Thus, in Fig. 1 is shown a right shoe with almost extreme degree of swing. It will be seen that the toe gripper is located at the apex of the shoe toe and the side grippers are accommodated to the sides. When the right shoe is replaced by a left shoe, the toe gripper is required to be thrown across symmetrically toward the right and each of the side grippers is required to be shifted to correspond with the symmetrical reversal of the contour of the shoe. In the present machine I have so arranged that a single operative movement of a reversing handle will completely reverse the several grippers for the purpose explained. For convenience I employ the same handle 125 already mentioned, this being at the lower end of the lever 124, secured on rearwardly extending rock shaft 123. Referring to Fig. 6, the handle 125 is at the right and the pulling-over grippers are shown set for a right shoe. When the handle is thrown to the left, as in Fig. 7, the grippers are all symmetrically reversed, as therein shown. The connections for effecting the reversing movement will now be referred to.

Referring to Fig. 3, it has been already explained that the toe gripper is carried and operates within a sleeve 76. This sleeve, while normally stationary during the pulling operations, is adapted to be bodily shifted with the gripper mechanism in the manner just explained. For this purpose the sleeve 76 is mounted at the upper end of a rock lever 144, as shown also in Fig. 4. This rock lever is yoked at its upper end to straddle the sleeve 76 and permit a pivotal movement for a purpose to be later explained. The rock lever is secured to the rock shaft 123.

As a consequence of this structure the throwing across of the reversing handle 125 reverses the rock lever from the position shown in Figs. 4 and 6 to that shown in Fig. 7. This reversing movement is always symmetrical in extent by reason of the provision of a pair of symmetrically opposite stops 145, adapted to be met by the reversing handle and to thereby determine the two operative positions of the toe gripper. If desired, means for holding the parts in the respective opposite positions could be added, but the same are unessential and for convenience are omitted herefrom.

It has already been explained that the connections of the hand lever 57 are such as to permit the reversing movement described, and reference to Fig. 8 will show the capability of the hand lever swinging symmetrically from side to side to accommodate itself to the reversed adjustments of the toe gripper.

For correspondingly reversing the side grippers 55, 56, the following means may be employed, referring particularly to Figs. 6, 7, 10 and 11. Each side gripper is capable of swinging toward and from the center of the machine about the gripper shank 92. Thus, in Fig. 6 the left side gripper stands substantially upright, while the right gripper stands inclined toward the center of the machine, these positions serving to adapt the grippers to the contour of a right shoe, which is indicated in dotted lines. The reversed positions of the respective grippers are indicated in Fig. 7, where the last of the left shoe is shown in dotted lines. In order that the side grippers, when reversed, may be brought to stop in their proper positions, I provide a pair of symmetrically opposite stops 146. These, as indicated in Figs. 6 and 11, are contacted directly by the upper inner gripper jaws 88, 90. The actual reversing movement from the Fig. 6 to the Fig. 7 position may be effected in any convenient manner, and I have shown a resilient device 147, 148, by which the throw of the hand lever 124 causes the side grippers to be reversed. Thus, on reversing the handle 125 all three grippers are properly reversed.

Upon reversing all the grippers the adjustments are ordinarily necessary since the present machine is so constructed that, when the pulling-over mechanism is adjusted for a right shoe, the same adjustments serve properly for a symmetrical left shoe when the mechanism is reversed by the handle 125.

Various adjustments may be made in different ways to suit the pulling-over mechanism to variations in shoes as regards length, width, degree of swing and other variations of contour.

I have already described how the entire pulling-over mechanism may be bodily adjusted by the handwheel 49 upwardly or downwardly to adapt it to shoes of varying lengths, and how the shoe rest 129 may be vertically adjusted when required. In addition I have provided the following adjustments.

The toe gripper device may be longitudinally tilted to alter the angle at which the jaws are presented to the work, and at the same time this adjustment permits the height of the jaws to be varied slightly after the bodily vertical adjustment by the handwheel 49 has been completed. Thus, referring to Fig. 3, the carrier sleeve 76 of the toe gripper is shown pivoted, as before explained, to the yoked upper end of the supporting rock lever 144. The adjustment may may be made by elevating the rear extremity of the toe gripper device, and vice versa. This adjustment may be effected by thumb piece 150, shown also in Fig. 5, which serves to rotate a threaded shaft 151, which passes through a sleeve 152, having a swivel connection with the carrier sleeve 76, before mentioned. The shaft 151 is confined against longitudinal movement in sleeve 152, and its lower threaded end is engaged with a nut 153, which has a swivel engagement with a collar 154 on the rock shaft 123. The turning of the thumb piece in one direction or the other merely causes the lifting or dropping of the rear end of the toe gripper, for the purposes mentioned.

Another convenient adjustment, which enables the lateral throw or swing of the toe gripper to be varied, is performed by hand wheel 156, Fig. 6, which serves to symmetrically adjust the distance between the stops 145 that limit the reversing swing of the handle 125. The hand-wheel 156 is mounted on a reversely threaded shaft 157, which is prevented by a device 158 from endwise motion, its two threaded portions being engaged by carriers or nuts 159, on which are formed the stops 145. By this arrangement the turning of the hand wheel in one direction or the other causes the toe gripper in its reversed positions to stand nearer or farther from the center of the machine, as desired.

Another convenient adjustment is a bodily adjustment of the side gripper devices symmetrically to and from each other for the purpose of adapting them to variations in width of shoes. I have already referred in connection with Fig. 3 to the opposite side blocks 95, each of which carries one of the side gripper mechanisms. These two blocks may be adjustably shifted toward or from each other by means of a hand-wheel 161, shown also in Fig. 6. The hand-wheel is mounted on a reversely threaded shaft 162, having a central device 163 to prevent endwise movement, and the blocks 95 are provided with threaded lugs 164 engaging the respective ends of the shaft. By this arrangement turning the hand-wheel 161 in one direction or the other causes the blocks 95 and the entire side gripping devices carried thereby to approach or recede, as desired. In this connection see also Fig. 10.

Another adjustment is of the swing or throw of the side grippers when they are reversed for rights and lefts. Figs. 6 and 7 show the respective positions for a pair of decidedly curved shoes. Shoes having a different curvature would require readjustment of the swing or angle of the side grippers. This adjustment may be effected by hand-wheel 166, Figs. 6, 7 and 10. It has already been explained that the side grippers respectively pivot about their shanks 92 as axes. These axes are at the lower inner corners of the grippers. The hand-wheel 166, therefore, is utilized to vary the spacing between the upper corners of the respective grippers. The wheel is shown mounted on a threaded shaft 167 engaging in a pair of nuts 168, each of which has a swivel connection with the top side of the respective heads 93 of the gripper shanks. By this device, when the side grippers are thrown leftward to the position of Figs. 6, 10 and 11, the right side gripper abuts against the stop 146, and through the shaft 167 the left side gripper has its position also definitely determined. The same holds true when the side grippers are reversed in position, as shown in Fig. 7. In this way the adjustment for one shoe serves without readjustment for the other shoe.

Another adjustment of the side grippers is herein employed enabling their angle or swing to be determined according to variations in the swing or contour of the shoes. For this purpose a thumb piece 170 is shown, see Figs. 6 and 11. When this is turned one way or the other, the stops 146 are caused to symmetrically approach or recede. These stops have already been referred to. As shown in Fig. 3, they have a dovetail sliding connection with the rear side of the bracket 120. The thumb piece 170 is on a reversely threaded shaft 171, which is held from endwise movement by a suitable device, and the respective threaded portions of this shaft engage in threaded lugs 173 at the rear sides of the stops 146.

The manner in which the various adjustments may be performed may, for example, be as follows, assuming that the operator is changing from a batch of shoes of one size and style to shoes of a different size and style. After the shoe is placed on the jack and is brought up into its approximate position in front of the pulling-over mechanism, the hand-wheel 54 will be manipulated to adjust the pulling-over mechanism upwardly or downwardly into proper position relative to the shoe, and if necessary he may correct this adjustment subsequently to the making of the other adjustments. The topmost shoe rest member 129 may be altered now, if necessary, or this may have been done previously to the vertical adjustment of the entire mechanism. In setting the grippers in proper relation to the shoe, the hand-wheel 156 may now be manipulated to give the toe gripper the proper swing, so that it will act in direct line with the apex of the shoe toe. If necessary, the thumb piece 150 may be manipulated to slightly tilt the toe gripper longitudinally, thus bringing it into better relation to the shoe toe. The side grippers may then be bodily adjusted from and toward each other, to suit the width of the shoe, by the hand wheel 161, and their swing or angle may be altered by the hand-wheel 166, so that both side grippers will closely conform to the contour of the shoe. When this is done, the thumb piece 170 may be adjusted to bring the stop 146 up against the side gripper. The mechanism will then be in readiness for operation, and upon reversal of the handle 125 will be in readiness for the other shoe of the pair.

The jack mechanism hereof includes a main jack arm, which swings about a lateral horizontal axis from pulling-over position forwardly and downwardly into lasting position, and shoe holding devices, (clamp and frame) which swing bodily relatively to the jack arm about an axis which, in lasting position, is vertical. The jack is shown in its first position in Figs. 1, 2, 19 and 20. Figs. 24, 25 and 26 show it in its final position, while Fig. 26 in dotted lines indicates the intermediate position of the shoe, after being swung down, but before the shoe holding clamp is swung to the left.

Referring first to Figs. 1, 2, 24, 25 and 26, the main jack arm 175 is of L-shape, and its fulcrumed extremity is provided with a hub which engages around a stud 176, extending between the two side webs of the stationary upright bracket 38, previously referred to. By this arrangement the free end of the jack arm may swing forwardly and downwardly in a vertical plane. In this position the jack as a whole is U-shaped in side elevation, the arm 175 forming an L, and the clamp devices completing the U, as seen in Fig. 26. This construction conveniently affords the shoe shifting movements described.

When the jack is in its first position, the arm 175 may be held in any convenient way, for example, by a spring latch 177, mounted on the jack arm, adapted to engage or hook over a cross bar 178 arranged above the jack arm fulcrum. The latch has a forwardly extending handle 179, which may be depressed by the operator when it is desired to shift the shoe from pulling-over to wiping position. Instead of or in addition to the latch 177, a counterbalance 180 may be provided, tending to hold the jack in its first position and at the same time relieving the operator from the work of lifting and lowering the heavy jack arm clamp and connected parts. When the jack is swung to its forward and downward position, it may be for convenience brought to a stop by a lug or surface 181, as seen in Fig. 26, so that in this position of the parts the jack and the shoe holding devices are firmly supported, as is requisite during the wiping operations. To render the jack more firm it is shown provided with a pair of outstanding bosses 182 at its opposite sides, adapted to engage with corresponding bosses 183 on the insides of the webs of bracket 38, thus preventing side play of the jack arm when in wiping position. I will later describe means for locking in its final position the shoe clamping frame, which is carried at the free extremity of the jack arm.

As has been before stated, I prefer to engage the heel end of the shoe last with the jack mechanism by means of a spindle adapted to enter the spindle recess in the last, and for this purpose the extremity of the jack arm 175 is provided with supporting means in the form of a yoked bearing 184 for a shoe last spindle 185.

Fig. 2 shows the relative position of these parts with the shoe, and it also shows at the shoe end of the spindle 185 a pintle 186, which directly engages the recess and the last, and is capable of swinging adjustment on the spindle, being secured at any desired angle by thumb-screw 187.

The shoe clamp proper is carried on a frame 190, and, to permit the swinging of this frame about an axis substantially near the heel of the shoe, I mount it directly on the spindle 185 between the two sides of the yoked bearing of the latter, as seen in Fig. 2. The shoe clamp frame is freely swingable relatively to the spindle except as limited by stops, which will be later described.

The spindle is capable of a slight endwise movement for the purpose of adjustment for changes in height of shoes, and when adjusted further longitudinal movement may be prevented by means of any convenient device such as the pinch ring 191, which may be tightened about the spindle by a screw rotated by handle 192. The clamp frame 190 is formed to admit the pinch ring 191 between its two sides.

The spindle 185 and the pinch ring 191 are precluded from rotation relatively to each other by a spline 193, which, however, does not prevent the clamp frame from swinging relatively to the spindle. See Fig. 19.

As the pintle 186 is usually inclined to the axis of the spindle 185, it is desirable to provide means to insure that these parts will stand in their proper position during the inserting of the shoe, and for this purpose I have provided a stop projection 194 formed on the pinch ring 191, as seen in Figs. 19 and 20, adapted to contact against the web of the jack arm 175 at one side. These figures show the clamp frame standing in an upright position, which is the normal position of the clamp when clamping the shoe. When inserting the shoe or during pulling-over, it may be desirable to throw the clamp to one side, and locking at Fig. 19 the clamp may be thrown to the right to a convenient angle, as indicated in dotted lines, at which it may be held by a stop contact 195, arranged to strike against a portion of the pinch ring 191, or rather, the screw tightening lever thereof.

When the clamp frame is thrown or swung relatively to the jack from its pulling-over to its wiping position, it is necessary that the spindle 185 should turn along with the clamp frame, the spindle and clamp both being at that time rigidly engaged with the shoe. For this purpose a projecting contact 196 is provided on the pinch ring 191, adapted to be struck by the clamp frame 190 as the latter is swung around to the left. Thus, in Fig. 19 the clamp frame is shown as contacting the projection 196. When the frame is swung leftward through 90°, it will correspondingly thrust the projection and the pinch ring around to the same extent, thus rotating the spindle 185 and the pintle 186 into the proper positions that they are to assume during the wiping operation.

Figs. 24 to 26 show the clamp arm swung forwardly and downwardly and the clamp frame swung to the left. This represents the third or final position of the jack and clamp. In order to lock the parts in this final position, the left side of the clamp frame in Fig. 19, which will be its rear side in Figs. 24-26, is provided with a recessed lug 198. This recess is adapted to admit a locking pin 199, see Figs. 1 and 2. This is a spring actuated pin with a beveled lower surface, so that the lug may easily pass under it into locked position. At this time the lug is held against vertical movement by a pair of separated lugs 200 above and below the lug 198, respectively. The lugs 200 are formed at the front side of a bracket 201, secured on the base or pedestal 37 of the machine. The upper lug 200 forms a sliding bearing for the spring pin 199. This pin is provided with an unlocking device consisting of a bent lever 202, which may be easily reached and swung for lifting the locking pin, so that the operator may swing the clamp frame forwardly from the final or wiping position.

As seen in Fig. 2, the clamp members which actually engage the shoe comprise a toe pad or member 204, arranged across the top of the shoe near the toe, and a pair of side pads 205, a little farther to the rear and smaller in size. Opposed to these are underreaching hooks or sole engaging members 206, which serve as hold-downs during the wiping operation. As seen in Fig. 2, the shoe engaging members 204, 205, 206 are all located at the left or shoe end of the clamp mechanism. They are supported upon a stout horizontal rod or plunger 207, which at its left end supports the clamp members, and at its right or forward end has its support in the swinging clamp frame 190. The plunger is not directly connected to the frame, but is engaged in a carriage 208, which is arranged to slide upwardly and downwardly within the frame for purposes of adjustment of the clamp for variations of shoe length.

This clamp carriage 208, which is best shown in Figs. 19 to 22, is a built-up four-part structure, its front parts being secured by screws to the rear parts, thus forming right and left sides, which are flanged, as indicated in Fig. 22, to engage the sides of the frame. The carriage 208 is concavely recessed at its opposite sides near its upper portion to accommodate and confine and give sliding support to the plunger 207. The forward and rearward sliding of the plunger within the carriage permits the shoe clamp to be bodily retracted from or advanced toward the shoe, which may be done by the hand-wheel 209 at its outer end.

When the operator has adjusted the carriage 208 upwardly or downwardly to set the clamps to the length of shoe operated on, the carriage is required to be fixed against displacement in the clamp frame. This may be accomplished by means of a threaded shaft 210, the threads of which, as seen in Fig. 19, engage one side of the carriage, so that, when the shaft is turned, the carriage sides are thrust apart, thus firmly wedging and securing the carriage against movement. The exterior end of the threaded shaft 210 is formed with an offset or bent portion 211, which may be swung for turning the shaft. A link 212 extends from the shaft end 211 upwardly to a swinging handle 213, which may be thrown downwardly to cause the described carriage securing operation.

When the carriage has been adjusted to the proper height and the operator has thrust the plunger 207 forward by its hand-wheel into contact with the shoe, the plunger 207 is required to be secured against longitudinal sliding. For this purpose a pinch ring 214 is provided. This surrounds the plunger 207 and is confined against movement relative to the clamp frame by being engaged in a recess at 215 formed between the members of the carriage 208. Normally the pinch ring 214 is expanded, allowing free movement of the plunger. To close or pinch it against the plunger, a threaded shaft 216 is provided, passing loosely through one of the two separated upstanding ears of the pinch ring and threaded into the other one, the shaft having a collar contacting against the first ear, as best seen in Figs. 19 and 21. The exterior end of the shaft 216 has a bent portion 217 extending to the handle 213.

By this arrangement, when the handle 213 is thrown downwardly, after the clamp has been set at the proper point and placed in contact with the shoe, the downward handle movement effects the two locking operations, namely, locking the carriage and clamp against downward movement, and locking the plunger and clamp against longitudinal movement.

The several clamp pads or members 204-206 are supported from the plunger 207, which for the purpose is provided at its inner end with a block or collar-like head 220. This head at its two sides is provided with dove-tail tracks 221, which constitute slideways for a pair of carriers 222, the inner ends of which are connected at opposite sides of the toe pad 204. It should be stated that the toe pad has a certain amount of yield, being constituted, for example, of a rubber or similar resilient face and a spring metal back-piece. The pad, being of generally curved form, is able to adapt itself to different shapes of shoe when forcibly pressed in engagement therewith. The two carriers 222 are pivotally connected at the two sides of this flexible pad, as best shown in Fig. 21.

In order to permit the toe pad pressing with equal force against the two sides of shoes, whatever variations there may be in contour, the carriers 222 are independently movable and are actuated through an equalizing device or lever 223, having a slotted pivot at each end for the two carriers and centrally pivoted to the head 220 of the plunger. By this arrangement, when the plunger is thrust toward the shoe, the toe pad adapts itself to the shoe, the equalizing lever changing its position as may be necessitated.

The side clamp pads 205 are similarly constructed. Each pad is universally jointed to a block 225, connected by a stout metal spring to a carrier 226 having curved adjustment by means of arc-shaped dove-tail guides at the undersides of the carriers 222, already mentioned. This adjustment is for the purpose of permitting the side pads to be separated or brought nearer together, according to differences in widths and curvatures of lasts. Such adjustment may be effected by means of a reversely threaded shaft 227, held against longitudinal movement by a device 228 near its center, and its threaded portions engaging in nuts 229 swiveled beneath the respective carriers 226. The device 228 comprises a collar loosely surrounding a threaded shaft between a pair of fixed collars, the loose collar head having a pin projecting through the slotted extension of fork 230 at the extreme rear end of the plunger 207, as will be understood from Figs. 22 and 23.

The hold-down hooks 206, which reach around and bear against the underside of the last or sole in opposition to the toe and side pads 204-205, are best shown in Figs. 21 and 22. Each hold-down member or hook has a shank 232, a portion of which is formed into a curved cam surface 233, and both are pivoted to a cross-piece 234, rigidly secured at the lower side of a collar 235, loose on the plunger 207.

In order to apply compression to the clamp devices, the hooks 206 may be pulled upon by means of a pair of straps or pull bars 236, secured at the top and bottom, respectively, of the collar 235, and extending forwardly to where the extremities of the straps 236 are turned down into hooks 237, engaging with the grooved hub 238 of the hand-wheel 209. It will be noticed that the pull straps 236 extend substantially parallel with the plunger 207, and to accommodate them the clamp carriage 208 and the pinch ring 214 are recessed, as indicated.

The figures show the clamp closed on the shoe, the hand-wheel 209 having been drawn forwardly by turning it leftward. This operation is reversed to open the clamp. When the hand-wheel is turned to the right, the straps 236 are moved rearwardly, and the hold-down hooks 206 are thereby moved away from the sole of the shoe. During this action the cam surfaces 233 of the hold-down shanks come into engagement with cam rolls 239 mounted on the block or head 220 of the plunger. This coöperation cams the hold-downs from each other, so that they are sufficiently separated to permit bodily movement of the clamp toward and from the shoe. When the clamp has been bodily shifted, so that the pads 204, 205, bear upon the shoe, the clamp will then be closed by turning the wheel 209 so as to draw the hold-downs forwardly, and by this action the cams 233 and the rolls 239 permit the hold-downs to approach under the influence of a spring 240, so as to assume the clamped position shown in the figures.

The clamp may be very tightly closed and secured when the wheel 209 is turned to the left in the manner described. The wheel 209, therefore, has two functions; first, the bodily shifting of the clamp toward and from the shoe, and, second, the opening and closing of the clamp as described.

I will now describe the toe wiping mechanism 46, which is completely shown in front view in Fig. 1, and in left elevation in Fig. 2, while details are more fully shown in Figs. 27, 28 and 29.

The toe mechanism is located above the left extension 39 of the machine base, being mounted on a swinging bracket 250, by which the mechanism may be moved bodily toward or from the shoe. Sliding on the bracket 250 is a rising and falling support 251, adapted to be lifted or dropped during the wiping operations by means of a pedal 252.

Intermediate of the bracket 250 and the machine base 37 is a swinging arm 253, mounted for convenience on the same fulcrum or center as the swinging bracket 250. The arm 253 is arranged to be quickly shifted for a substantial extent toward and from the base 37, and the bracket 250 is adapted to be adjusted with respect to the arm 253 by means of a screw threaded shaft or bolt 254. The threaded portion of the bolt is engaged by an interiorly threaded nut or wheel 255, the grooved hub of which at its left side is engaged by bent straps or hooks 256, secured to the swinging bracket 250. Between the threaded bolt 254 and the arm 253 is a slotted pivot connection 257. By this arrangement, when the wheel 255 is turned in one direction or the other, the bracket 250 is caused to swing from or toward the arm 253.

As the parts are shown in Fig. 1, the toe wiping mechanism is retracted from wiping position. In order to bodily shift it into wiping position by a quick movement without use of the screw device 254, 255, the arm 253 is arranged to freely shift toward the right while being restrained against unlimited movement to the left. For this purpose a link 258 is extended between the arm 253 and the base 37. This link is pivoted to the base by means of a shiftable pivot 259, which may be in the form of a pin that can be extracted and replaced in any one of the five perforations shown, so that the normal retracted position of the toe wiping head may be initially predetermined.

The link 258 has the sliding pivot 260 at its left end, engaged in a slot in the arm 253. This slot has an inclined portion 261, arranged so that, when the toe wiping head is thrown to the right, its pivot 260 will ride up the slot; and the slot also has a vertical portion 262, into which the pivot may drop, so as to lock the toe wiping mechanism in its operative position. A simple lifting of the link 258 unlocks the arm 253, when it is desired to quickly bodily retract the toe wiping head.

The portions of the toe wiping mechanism just described are claimed to be novel, and also the mechanism shown just above the bracket 250 in Fig. 1. The actual wiper plates, however, and their actuating connections at the top of the wiping head are not herein claimed to be novel, but the same are made the subject of a separate application of mine, Serial No. 119,415, filed September 11, 1916.

The wiper plates 264 at the righthand side of the mechanism are adapted to be actuated by a handle 265 at the left thereof. These and the connections between them are mounted on suitable carriages, which are bodily supported by a tilting trunnion connection at the top of a bracket 266, and through this arrangement by the aid of a hand-wheel 267 the longitudinal tilt or slant of the toe wiping mechanism may be regulated. For further details of these parts and connections, reference is made to said copending application 119,415.

I have so far described the bodily movement and adjustment of the toe wiping head toward and from the shoe, also its upward and downward movement through the sliding support 251, also its longitudinal tilting adjustment of the hand-wheel 267 and the operating or wiping movement of the handle 265. I will now describe an advantageous mechanism for reversing the position of the toe wiping head to adapt it to operation on right or left shoes. Fig 27 shows the mechanism in its position forward of the axis of the machine operating upon a left shoe, and it will be seen that, when a right shoe is substituted for a left shoe, the wiping mechanism must be shifted symmetrically across from the front to the rear side of the machine, as seen in Fig. 28. In addition to the bodily movement across the axis of the machine, the toe wiping mechanism is required to be bodily swung angularly, so that the line of wiping action will be correctly in line with the shoe toe apex.

The base portion of the trunnion bracket 266 is of a circular form, its center being pivoted and held down to the parts beneath by means of a central pivot or headed bolt 269. The bracket 266 is adapted to rotate about this pivot for the purpose of changing the line or direction of wiping action. The bracket base bears upon and is supported directly by a flat plate 270, which is of an oval or pear shape, as more fully seen in Fig. 29. From the central pivot 269 the bearing plate 270 extends leftwardly, and there its extremity is pivoted at 271 to the rising and falling support 251, or rather, to the flat table-like portion 272, rigidly fixed at the top of the rising and falling support.

The bracket which carries the toe wiping head, being pivoted at 269 upon the plate 270, is capable of being bodily shifted across the axis of the machine by swinging the plate 270 about its pivot 271, and for accomplishing this a handle 273 is arranged in rigid relation with the plate 270. The plate is adapted to be locked in each of its extreme positions, and, for unlocking it to permit shifting, a handle 274 is pivoted to the reversing handle 273. The lock handle has a simple link and lever connection with a radially arranged locking bolt or pin 275, the outer end of which is adapted to engage in either of two symmetrically opposite locking sockets 276, mounted at the ends of a pair of adjustable arms 277, arranged for convenience to swing about the same center or pivot 271 as the plate 270.

By this arrangement the toe wiping head can be thrown reversely across the axis of the machine from the Fig. 29 position by grasping the two handles 273 and 274, which serves to unlock the plate 270, so that on throwing the handles to the right the parts may be brought from the Fig. 27 position to the Fig. 28 position, whereupon, on releasing the handles, they again become locked. In order to permit adjustment of the extreme positions of the toe wiping head to accommodate the same to variations in the swing or angularity of shoes, while at the same time preserving the symmetry of the reversed positions, the arms 277, which carry the locking sockets, may be adjusted toward and from each other by means of a reversely threaded shaft 278, which at its center is held against endwise movement by a device 279, and which at its threaded portions has swiveled nuts 280 connected to the arms 277. By this arrangement of the mere turning of the thumb piece at the forward end of the adjusting shaft 278, the stop devices are symmetrically adjusted toward or from the axis of the machine.

In order to symmetrically reverse the angle of wiping action between the position shown in Figs. 27 and 28, a means may be employed for suitably rotating the bracket 266 upon the pivot 269. Instead of doing this by a separate hand operation, I have shown simple connections, including a link 281 pivoted to the base of the bracket 266, the other end of the link being passed loosely through a swiveled sleeve 282, mounted on the table 272, and a stop in the form of lock nuts 283 at the threaded extremity of the link. By this arrangement, when the reversing handle 273 is thrown to the right in Fig. 29, the link 281 swings and slides loosely in the sleeve 282 during the bodily shifting of the wiping head from the front to the rear of the machine, until, in the final portion of the reversing movement, the stop nuts 283 are brought up against the sleeve, causing the link 281 and the base of the bracket 266 to straighten out, causing a rotation of the bracket into a position the reverse of that seen in Fig. 29.

The heel wiping mechanism or head 45 is seen in front view in Fig. 1, in plan view in Figs. 27 and 28, and in detail in Figs. 30, 31 and 32. The mechanism is bodily shiftable toward and from the shoe through a swinging bracket 284, pivoted at its lower end to the base extension 4C. A screw adjusting device 284ª serves to set the bracket 284 toward or from the shoe. A more extended bodily shifting in this direction is provided for at a higher point in the structure.

At the left of the heel mechanism are the wiper plates 285, which are actuated by a handle 286 at the right. These parts and the connections between them may comprise suitable details, for example, as shown in my Patent No. 1,222,127, issued April 10, 1917, all of which are mounted on a rising and falling carriage 287, which may be adjustably lifted and dropped by a screw adjusting device 288. These parts are carried bodily by a dovetail connection upon a longitudinally shifting carriage 289, which may be moved bodily toward and from the shoe by a rack and pinion actuated by a handwheel 290, through which the heel wiping mechanism is brought snugly into operating position.

This entire mechanism is carried bodily on a tilting platform 291, pivoted to swing about the same axis as that of the handwheel 290. A wheel and screw device 292 is shown for the purpose of adjusting the tilt of the platform 291. All this mechanism is supported by a centrally pivoted carriage 293, which is adapted to rotate about a substantially upright axis, so as to permit the heel wiping mechanism to be swung to different angles with respect to the shoe. The fulcrum of the rotating carriage 293 is afforded by a headed pivot or pin 294, which serves also to hold the carriage downwardly in proper place upon the oval or pear shaped bearing plate 295. This plate 295 at its larger or left end affords a circular bearing surface for the rotating carriage 293 above it. It is analogous to the similarly shaped plate 270 of the toe wiping mechanism. The heel mechanism may be bodily thrown across the axis of the machine by swinging the plate 295 forwardly or rearwardly, while all the mechanism above it may be rotated with respect to the plate.

The plate 295 in its reversing movements swings above the flat table-like top 296 of the swinging bracket 284. The plate at its smaller or right end is pivotally secured at 297 to the table 296 to permit the bodily reversing movements mentioned.

To enable these movements to be performed by hand, the handle 298 is provided, formed rigidly with the pear shaped bearing plate 295. By throwing this handle forwardly or rearwardly the heel wiping mechanism may be bodily shifted between the symmetrical positions indicated in Figs. 27 and 28. Instead of symmetrically reversing the angle of action of the heel wiping mechanism by a separate manipulation, I have shown simple connections analogous to those described for the toe wiping mechanism, whereby, when the heel mechanism is bodily thrown across the axis of the machine, this movement automatically effects rotation of the mechanism about the pivot 294 to reverse the tilt, as desired.

As a contacting stop to determine the reversed positions of the parts, I employ the upright threaded shaft 292, which is also used for effecting the adjustment or tilt of the platform 291. The rotating carriage 293 is provided at its left end with a boss or enlargement 299, which is internally threaded to engage the shaft 292, as seen in Fig. 30. It will be noticed from Figs. 30 and 32 that the flat table-like top of the bracket 284 is provided at its left end with a pair of leftwardly extending ears, which accommodate screw adjustable stop contacts 300, 300. These are adapted to be contacted by the upright shaft 292. Also, the pear shaped swinging bearing plate 295 is provided, between its body portion and the leftward extending handle 298, with a recess to accommodate the upright shaft 292 and a pair of stop contact screws 301, adapted to contact against the shaft 292, as seen in Fig. 31.

The reversing operation may be substantially as follows. Figs. 28, 30, 31 and 32 show the parts in position for wiping a right shoe. When the handle 298 is thrown in the direction of the arrow, Fig. 30, that is, rearwardly across the machine for reversing the heel wiping mechanism to operate on a left shoe, this causes the entire pear shaped bearing plate 295 to swing rearwardly about its pivot 297 until the forward screw contact 301, instead of the rear contact, comes up against the stop shaft 292. Thus far the reversing operation has merely bodily carried the heel wiping mechanism symmetrically across the axis of the machine. At this point, however, it is not properly directed toward the heel of the left shoe, and requires to be symmetrically swung or rotated. As already explained, this rotation is performed by the turning of the rotary carriage 293 about its central pivot 294. This swing or rotation is caused by the continued movement of the handle 298. The front contact screw 301 is bearing against the contact shaft 292. The shaft, therefore, is compelled to move rearwardly from its forward position, shown in Fig. 32. In so swinging the shaft 292 is carried symmetrically from the front screw contact 300 to the rear screw contact 300. This action, as will be clear from Fig. 30, swings the rotary carriage 293 about its central pivot, thus effecting the desired rotation or swing of the heel wiping mechanism.

The throw, therefore, of the handle 298 across the machine effects in succession two results; first, the bodily shifting of the wiping mechanism across the axis of the machine, and thereafter the bodily rotation of the mechanism in order to direct its line of wiping action properly with respect to the heel of the shoe. The parts now assume the Fig. 27 position.

In order to hold the centrally pivoted carriage 293 and the pear shaped bearing plate 295 properly down against the table top 296 throughout the reversing movements and during the wiping action, I have provided a hold-down bolt 302, having heads above and below and passing through concentric slots in the members 296 and 293, and snugly engaging a corresponding hole provided in the bearing plate 295.

The general mode of operation with the described machine may be as follows: The operator engages the last of the shoe upon the spindle of the jack, thus positioning the shoe by its heel end, and, the jack being swung upwardly, the shoe toe end or forepart is laid in contact against the shoe rest or abutment, which is associated with the pulling-over mechanism. The pulling-over mechanism will then be adjusted up or down, as may be necessitated by the length of the shoe. This carries the abutment with it, and, if desirable, the abutment top member may be further adjusted up or down to suit the shoe. Assuming that it is the right shoe of a pair, the toe gripper device will be thrown to the left by its handle, and all necessary adjustments of position, width and angle of the several grippers will be effected as previously described. The mechanism is now in readiness for pulling-over, and this will be performed, first, by manipulating the foot pedal to close and retract all of the grippers. This action may be supplemented by separate pushing operations upon the individual hand levers for the toe gripper or side grippers, until the operator is satified with the pulling operation. Preferably at this stage the operator will apply the shoe clamp over the last and pulled upper, and thus securely fix the shoe in the jack prior to the shifting of the shoe from its initial or pulling-over position. He will then throw the gripper releasing handle downwardly, this serving to open all the grippers and permitting him, after unlocking the jack, to bodily swing the jack and shoe forwardly. He may now release the foot pedal without danger of injury to the shoe. The jack carries the shoe forwardly from its initial position, in which the forepart of the shoe sole is substantially upright, through substantially a right angle, until the sole forepart is substantially horizontal, this being the most convenient wiping position of the shoe. The toe end of the shoe, however, is directed toward the operator. He throws the shoe toe to the left by swinging the shoe clamp frame about its pivot until the shoe comes into final or wiping position, in which it becomes locked. It will be noticed that the wiping position of the shoe is predetermined at the time the shoe is first set into engagement with the spindle on the jack and the abutment of the pulling-over mechanism. The jack and the wiping devices, as well as the pulling-over mechanism, are arranged to adapt themselves to the predetermined shoe position. The heel wiping mechanism will now be adjusted into proper relation with the shoe heel by means of the various swinging, sliding, tilting and elevating devices described, and the heel wiping will be performed by the wiping handle in the usual manner. This mechanism may be left in engagement with the shoe while the toe wiping mechanism is analogously brought up to the shoe and adjusted and operated. No adjustment of the lateral tilt of the toe wiping mechanism is necessary, since, as before explained, the plane of the shoe sole forepart has been predetermined. The adjustment of the longitudinal tilt of the toe wiping mechanism enables it to be adjusted to compensate for any change of tilt caused by the bodily swinging of the entire mechanism on its swinging supporting bracket. After the completion of the wiping, the wiping mechanisms will be retracted, the shoe unclamped and removed, the jack unlocked and elevated to initial position, and the left shoe in serted upon the jack and brought into contact with the stationary abutment. No further adjustments of the pulling-over or wiping mechanisms are required, but only simple reversals. Thus, the pulling-over reversing handle is thrown from right to left, thus symmetrically shifting the other grippers, and the machine is in readiness for a repetition of the pulling-over operation. After this is completed and the shoe is clamped in the jack and released from the grippers and swung forwardly and downwardly into the wiping plane, and thence to the left into the wiping position, the heel and toe wiping mechanisms may be quickly and simply reversed by the throw of their respective reversing handles, so that the wiping of the left shoe proceeds without undue delay.

It will thus be seen that I have described a novel lasting machine and novel mechanisms, combinations, devices, and arrangements embodying the principles and attaining the objects and advantages of the present invention.

Since many matters of design, arrangement, combination, detail and other features may be variously modified without departing from the main principle hereof, it is not intended to limit the present invention to such features except in so far as specified in the appended claims.

What is claimed is:

1. In a lasting machine, a movable shoe-supporting jack adapted in one position to hold the shoe with its sole rearward and its toe pointed upwardly in an elevated location in front of the workman's eyes, pulling-over mechanism adapted to operate upon and release the shoe in such position, said jack adapted to bodily lower the shoe to a wiping location substantially beneath the workman's eyes and swing it to a posture with its sole upward, and wiping mechanism adapted to operate upon the inverted shoe in its lowered position.

2. In a lasting machine, a movable shoe-supporting jack adapted in one position to hold the shoe with its sole rearward and its toe pointed upwardly in an elevated location in front of the workman's eyes, pulling-over mechanism adapted to operate upon and release the shoe in such position, said jack adapted to bodily lower the shoe to a wiping location substantially beneath the workman's eyes and swing it to a posture with its sole upward, by a movement consisting of a bodily forward and downward swing about an axis substantially beneath the shoe heel apex in its pulling-over position and to the rear thereof in its wiping position, and wiping mechanism adapted to operate upon the inverted shoe in its lowered position.

3. In a lasting machine a shoe-supporting jack including a shoe clamp, said jack and clamp having a pulling-over position wherein the shoe is held with the sole rearward and the toe pointed upwardly, said jack being bodily swingable to swing the shoe forwardly into a position with the sole upward and substantially horizontal, pulling-over mechanism operable in the pulling-over position of the shoe, and wiping mechanism operable in the wiping position of the shoe.

4. In a lasting machine a shoe-supporting jack including a shoe clamp, said jack and clamp having a pulling-over position wherein the shoe is held with the sole rearward and the toe pointed upwardly, said jack being bodily swingable to swing the shoe forwardly into a position with the sole upward and substantially horizontal, said clamp being swingable in the jack to turn the shoe horizontally into a convenient wiping position, pulling-over mechanism operable in the pulling-over position of the shoe, and wiping mechanism operable in the wiping position of the shoe.

5. In a lasting machine a shoe-supporting jack including a shoe clamp, said jack and clamp having a pulling-over position wherein the shoe is held with the sole rearward and the toe pointed upwardly, said jack being bodily swingable about an axis beneath the shoe to swing the shoe forwardly and downwardly through substantially a right angle into a position with the sole upward and substantially horizontal, pulling-over mechanism operable in the pulling-over position of the shoe, and wiping mechanism operable in the wiping position of the shoe.

6. In a lasting machine a shoe-supporting jack including a shoe clamp, said jack and clamp having a pulling-over position wherein the shoe is held with the sole rearward and the toe pointed upwardly, said jack being bodily swingable about an axis beneath the shoe to swing the shoe forwardly and downwardly through substantially a right angle into a position with the sole upward and substantially horizontal, said clamp being swingable in the jack to turn the shoe through substantially a right angle into its wiping position, pulling-over mechanism operable in the pulling-over position of the shoe, and wiping mechanism operable in the wiping position of the shoe.

7. In a lasting machine, pulling-over mechanism comprising shoe upper grippers, wiping mechanism, the pulling-over grippers being substantially more elevated and farther rearward than the wiping mechanism, a jack including a rigid arm fulcrumed about a transverse horizontal axis substantially beneath the pulling-over grippers and to the rear of the wiping mechanism, whereby the shoe may be swung forwardly and down, a clamp frame pivoted directly to the clamp arm to permit swing of the shoe in a plane at right angles to its first mentioned swing, and a shoe clamp for holding the shoe immovably in said frame throughout the shifting and wiping operations, whereby after the pulling-over operation the clamped shoe may be swung over forward and downward into horizontal position and laterally into wiping position.

8. In a lasting machine, a shoe-supporting jack shiftable between pulling-over and wiping positions, a shoe holding means comprised in said jack adapted to hold all shoes in a given position with their soles in the same plane, pulling-over mechanism adjustable to the shoe in its pulling-over position, and wiping mechanism adjustable to the shoe in its wiping position.

9. In a lasting machine, a shoe-supporting jack shiftable between pulling-over and wiping positions, a shoe holding means comprised in said jack adapted to hold all shoes with their soles in the same plane and to position them by their heel ends, pulling-over mechanism adjustable to the length of the shoe in its pulling-over position, and wiping mechanism adjustable to the shoe in its wiping position.

10. In a lasting machine, a shoe-supporting jack shiftable between pulling-over and wiping positions, a shoe clamp comprised in said jack adapted to hold all shoes in the same invariable position, pulling-over mechanism adjustable to both the length and angularity of the shoe in its pulling-over position, and wiping mechanism adjustable to the shoe in its wiping position.

11. In a lasting machine, a shoe-supporting jack shiftable between pulling-over and wiping positions, shoe holding means comprised in said jack for positioning the shoe by its heel end, pulling-over mechanism bodily adjustable to adapt it to operate upon the toe end of different shoes, means for holding the upper forepart in place upon the last after the pulling-over mechanism disengages the shoe and during the shifting of the jack, and wiping mechanism adjustable for operation upon the shoe after the shifting of the jack.

12. In a lasting machine, a shoe-supporting jack shiftable between pulling-over and wiping positions, shoe holding means comprised in said jack for positioning the shoe by its heel end and clamping it by its toe end during shifting, pulling-over mechanism bodily adjustable for different shoes, adapted to operate upon the upper at the toe end of each, and to release the shoe to permit shifting to wiping position, and wiping mechanism adjustable for operation upon the shoe after the shifting of the jack.

13. In a lasting machine, a shoe-supporting jack, shoe holding means comprising a spindle on the jack for engaging the usual spindle socket in the shoe last, and a shoe toe end clamp device carried by the jack, pulling-over mechanism bodily adjustable for different shoes, adapted to operate upon the upper at the toe end of each, and to release the shoe to permit shifting to wiping position, and wiping mechanism adjustable for operation upon the shoe after the shifting of the jack.

14. In a lasting machine, a shoe-supporting jack, shoe holding means comprised in said jack for positioning the shoe by its heel end, pulling-over mechanism bodily adjustable for different lengths of shoes, means for holding the upper forepart in place upon the last after the pulling-over mechanism disengages the shoe, and wiping mechanism adjustable to the shoe.

15. In a lasting machine, a shoe-supporting jack, shoe holding means comprised in said jack for positioning the shoe by its heel end, pulling-over mechanism bodily adjustable for different angularity of shoes, means for holding the upper forepart in place upon the last after the pulling-over mechanism disengages the shoe, and wiping mechanism adjustable to the shoe.

16. In a lasting machine, a shoe-supporting jack, shoe holding means comprised in said jack for positioning the shoe by its heel end, pulling-over mechanism bodily adjustable for different lengths and angularity of shoes, means for holding the upper forepart in place upon the last after the pulling-over mechanism disengages the shoe, and wiping mechanism adjustable to the shoe.

17. In a lasting machine, a shoe-supporting jack including a shoe clamp frame swingable about a point near the shoe heel, a heel engaging spindle located substantially at the axis of swinging of the clamp frame, and a toe end clamping device on said frame, a pulling-over mechanism operable in one position of the frame and jack and adjustable for differences in shoes, and wiping mechanism operable in a different position of the frame and jack; and said jack being bodily shiftable for changing the position of the spindle, clamp frame and shoe.

18. In a lasting machine, a stationary abutment for positioning the shoe sole forepart during pulling-over, pulling-over mechanism adjacent said abutment, a shiftable jack adapted to support or position the shoe heel end during pulling-over and to shift the shoe relatively to the abutment and pulling-over mechanism after the pulling-over operation, means other than the pulling-over for holding the shoe firmly clamped in the jack during shifting, and wiping mechanism operable on the shoe after the shifting of the jack and clamping means.

19. In a lasting machine, a stationary abutment for positioning the shoe sole forepart in a substantially vertical plane during pulling-over, pulling-over mechanism adjacent said abutment, a shiftable jack adapted to support or position the shoe heel end during pulling-over, means for holding the shoe firmly clamped in the jack during shifting, said jack being bodily shiftable by a swinging movement through substantially a right angle whereby to shift the shoe relatively to the abutment and pulling-over mechanism to a position with its sole substantially horizontal, and wiping mechanism operable on the shoe after the shifting of the jack and clamping means.

20. In a lasting machine, a stationary abutment for positioning the shoe sole forepart during pulling-over, pulling-over mechanism adjacent said abutment, a shiftable jack adapted to support or position the shoe heel end during pulling-over and to shift the shoe relatively to the abutment and pulling-over mechanism after the pulling-over operation, means other than the pulling-over for holding the shoe firmly clamped in the jack during shifting, and wiping mechanism operable on the shoe after the shifting of the jack and clamping means; said pulling-over and wiping mechanisms being each bodily adjustable longitudinally of the shoe to set them for various shoe lengths.

21. In a lasting machine, a stationary abutment for positioning the shoe sole forepart during pulling-over, means for adjusting said abutment longitudinally of the shoe for variations in shoe length, pulling-over mechanism adjacent said abutment, a shiftable jack adapted to support or position the shoe heel end during pulling-over, means for holding the shoe firmly clamped in the jack during shifting, and wiping mechanism operable on the shoe after the shifting of the jack and clamping means.

22. In a lasting machine, a stationary abutment for positioning the shoe sole forepart during pulling-over, pulling-over mechanism adjacent said abutment, means for bodily adjusting said abutment and pulling-over mechanism in unison longitudinally of the shoe, a shiftable jack adapted to support or position the shoe heel end during pulling-over, means for holding the shoe firmly clamped in the jack during shifting, and wiping mechanism operable on the shoe after the shifting of the jack and clamping means.

23. In a lasting machine, a stationary abutment for determining the shoe sole forepart plane during pulling-over, mechanism for pulling-over the shoe upper, a shoe supporting jack swingable relatively to said abutment and pulling-over mechanism through an invariable arc between pulling-over and wiping positions whereby the shoe sole forepart always assumes the same predetermined plane during wiping, and wiping mechanism including toe wiper devices adapted to operate in said predetermined wiping plane.

24. In a lasting machine, a movable shoe-supporting jack adapted in one position to hold the shoe with its sole rearward and its toe pointed upwardly in an elevated location in front of the workman's eyes, pulling-over mechanism adapted to operate upon and release the shoe in such position, said jack adapted to bodily lower the shoe to a wiping location substantially beneath the workman's eyes and swing it to a posture with its sole upward, wiping mechanism adapted to operate upon the inverted shoe in its lowered position, locking means for predetermining the pulling-over and wiping positions of the jack and shoe, and means for bodily adjusting said mechanisms to the shoe position.

25. In a lasting machine, a shoe heel engaging support for positioning the shoe longitudinally, an abutment for the shoe toe end, pulling-over mechanism, means for longitudinally adjusting said abutment to the shoe, said pulling-over mechanism being shiftable laterally to reverse it in position for right or left shoes, and means for reversibly shifting the abutment to adapt it to give support to the toe ends of right and left shoes.

26. In a lasting machine, a shoe heel engaging support for positioning the shoe longitudinally, an abutment for the shoe toe end, pulling-over mechanism, and means for longitudinally adjusting said abutment and said mechanism, in unison, to the shoe.

27. In a lasting machine, a pulling-over mechanism comprising closable and retractable grippers adapted to open and release the shoe upper during their return movement to non-retracted position, a single operating means or lever for causing the retracting of all the grippers to pull over the shoe upper, and a shiftable shoe-carrying jack adapted to commence the shifting of the shoe bodily away from the pulling-over mechanism before the grippers are restored to non-retracted position and in a direction substantially opposite to the pulling-over motion of the grippers.

28. In a lasting machine, a pulling-over mechanism comprising closable and retractable grippers adapted to open and release the shoe upper during their return movement to non-retracted position, a single operating means or lever for causing the retracting of all the grippers to pull over the shoe upper, and a shiftable shoe-carrying jack adapted to commence the shifting of the shoe bodily away from the pulling-over mechanism before the grippers are restored to non-retracted position and in a direction substantially opposite to the pulling-over motion of the grippers, and with a swinging movement to carry the shoe forward and downward to wiping position.

29. In a lasting machine, a pulling-over mechanism comprising closable and retractable grippers adapted to open and release the shoe upper during their return movement to non-retracted position, a single operating means or lever for causing the retracting of all the grippers to pull over the shoe upper, a shiftable shoe-carrying jack adapted to commence the shifting of the shoe bodily away from the pulling-over mechanism before the grippers are restored to non-retracted position and in a direction substantially opposite to the pulling-over motion of the grippers, and with a swinging movement to carry the shoe forward and downward to wiping position, and wiping mechanism located to operate upon the shifted shoe held in the jack.

30. In a lasting machine, a pulling-over mechanism comprising closable and retractable grippers adapted to open and release the shoe upper during their return movement to non-retracted position, a pedal for causing the retracting of all the grippers to pull-over the shoe upper, and a shiftable shoe-carrying jack adapted to be hand-operated to commence the shifting of the shoe bodily away from the pulling-over mechanism before the grippers are restored to non-retracted position and in a forward direction substantially opposite to the pulling-over motion of the grippers.

31. In a pulling-over mechanism a plurality of pulling-over grippers, a plurality of movable members or handles connected for separate retraction of the grippers, and a single member or pedal actuable to swing all the handles, said handles being independently operable after the operation of the pedal.

32. In a pulling-over mechanism a plurality of pulling-over grippers, a plurality of movable members or handles connected for separate retraction of the grippers, a single member or pedal actuable to swing all the handles, said handles being independently operable after the operation of the pedal, and a device for simultaneously releasing all the grippers, whatever the position of the handles and pedal.

33. In a pulling-over mechanism, means for holding right or left shoes, a toe gripper swingable for symmetrically reversing its position relatively to the shoe holding means, opposite side grippers each swingable to reverse its position to adapt it to right or left shoes, and a single member or handle connected for quickly reversing all said grippers when changing from right to left shoe.

34. In a pulling-over mechanism, means for holding right or left shoes, a toe gripper swingable for symmetrically reversing its position relatively to the shoe holding means, opposite side grippers each swingable to reverse its position to adapt it to right or left shoes, and a single member or handle connected for quickly reversing all said grippers when changing from right to left shoe; and a reversible abutment member shiftable by the said member or handle.

35. In a pulling-over mechanism, shoe holding means, a pulling-over gripper device reversible for right and left shoes, an abutment reversible for right and left shoes, and a single member or handle for reversing the gripper device and abutment in one operation.

36. In a pulling-over mechanism, means for holding right or left shoes, a toe gripper swingable for symmetrically reversing its position relatively to the shoe holding means, opposite side grippers each swingable to reverse its position to adapt it to right or left shoes, a single member or handle connected for quickly reversing all said grippers when changing from right to left shoe, and a single means for longitudinally adjusting all said grippers to variations in shoe length.

37. In a pulling-over mechanism, shoe holding means, a pulling-over gripper device reversible for right and left shoes, an abutment reversible for right and left shoes, a single member or handle for reversing the gripper device and abutment in one operation, and a single means for longitudinally adjusting said gripper device and abutment to variations in shoe length.

38. In a pulling-over mechanism, a shoe abutment transversely shiftable for changes in shoe contours, pulling-over grippers operable upon a shoe on said abutment, and a shoe holding jack adapted to bodily shift the shoe from said abutment and pulling-over gripper to a different position for wiping.

39. In a pulling-over mechanism, a shoe abutment transversely shiftable for changes in shoe contours, and longitudinally adjustable for changes in shoe lengths, pulling-over grippers operable upon a shoe on said abutment and a shoe holding jack adapted to bodily shift the shoe from said abutment and pulling-over gripper to a different position for wiping.

40. In a pulling-over mechanism, a toe gripper transversely swingable to reverse its position for the reversal of contour of right and left shoes, side grippers swingable to adapt them to the reverse of the shoe contour, and resilient connections whereby the reversal of the toe gripper effects the reversal of the side grippers.

41. In a pulling-over mechanism, shoe holding means, a toe gripper, a swinging carrier for said gripper having its axis substantially at right angles to the shoe sole near the ball of the shoe, whereby the gripper may be quickly reversed in position for right and left shoes, reversible side grippers, and connections whereby the swinging of said carrier effects the reversal of the side grippers.

42. In a pulling-over mechanism, shoe holding means, a laterally reversible carrier, a toe gripper device carried by said carrier, and symmetrically opposite stops for the carrier by which the mechanism may be quickly reversed for right or left shoes.

43. In a pulling-over mechanism, shoe holding means, a laterally reversible carrier, a toe gripper device carried by said carrier, symmetrically opposite stops for the carrier, by which the mechanism may be quickly reversed for right or left shoes, and means for simultaneously symmetrically adjusting said stops to adapt the gripper to variations in shoe curvature.

44. In a lasting machine, a pulling-over mechanism comprising toe and side grippers, each bodily swingable laterally for changing the machine for right or left shoes, and separate retracting levers for the grippers, such levers arranged for retracting movement and also adapted to swing laterally to accommodate them to the aforesaid lateral swing of the grippers.

45. In a lasting machine, a pulling-over mechanism comprising toe and side grippers, each bodily swingable laterally for changing the machine for right or left shoes, and separate retracting levers for the grippers, each having a handle portion, such levers arranged for retracting movement and also adapted to swing laterally to accommodate them to the aforesaid lateral swing of the grippers, the side gripper levers having their handle portions fitted against such lateral shifting.

46. In a lasting machine, a pulling-over mechanism comprising toe and side grippers, each bodily swingable laterally for changing the machine for right or left shoes, separate retracting levers for the grippers, such levers arranged for retracting movement and also adapted to swing laterally to accommodate them to the aforesaid lateral swing of the grippers, the side gripper levers having their handle portions fitted against such lateral shifting, and disconnectible connections between the respective levers and grippers.

47. In a pulling-over mechanism, a toe gripper device, means for retracting said gripper device to pull the shoe-upper, said gripper device being bodily tiltable to adjust it to the shoe, and means for adjusting the tilt thereof, said gripper device having a longitudinal shank carrying the gripping jaws at its forward end, a slideway for carrying and guiding said shank, a lateral fulcrum for one portion of such slideway to permit the tipping thereof, and adjusting means acting at another part of the slideway.

48. In a pulling-over mechanism, side grippers, a toe gripper, means for longitudinally adjusting the toe gripper to the shoe relatively to the side grippers, and means for bodily longitudinally adjusting all said grippers in unison.

49. In a pulling-over mechanism, shoe holding means, a bodily retractable gripper having opening and closing jaws, and two non-parallel links each extending across from one jaw to the other, whereby relative longitudinal movement of one jaw is accompanied by a swinging apart thereof from the other jaw.

50. In a pulling-over mechanism, shoe holding means, a bodily retractable gripper having opening and closing jaws, non-parallel links connecting said jaws, whereby relative longitudinal movement is accompanied by a swinging apart, and means for pulling one jaw to first close the gripper and then bodily retract it.

51. In a pulling-over mechanism, a gripper comprising a first jaw retractably mounted on a carrier or shank, a second jaw movable relatively to the first jaw for closing the gripper the said jaws being connected by a pair of cross links extending from jaw to jaw, and having their pivot points farther apart on the first jaw than on the second jaw, and a gripper tail connected with the second jaw to close the gripper and then bodily retract it.

52. In a pulling-over mechanism, a gripper comprising a first jaw retractably mounted on a carrier or shank, a second jaw movable relatively to the first jaw for closing the gripper, the said jaws being connected by a pair of cross links extending from jaw to jaw, and having their pivot points farther apart on the first jaw than on the second jaw, a gripper tail connected with the second jaw to close the gripper and then bodily retract it, and resilient means for restoring and opening the gripper.

53. In a pulling-over mechanism, a gripper comprising a first jaw retractably mounted on a carrier or shank, a second jaw movable relatively to the first jaw for closing the gripper, the said jaws being connected by a pair of cross links extending from jaw to jaw and having their pivot points farther apart on the first jaw than on the second jaw, a gripper tail connected with the second jaw to close the gripper and then bodily retract it, a movable actuating member or lever, connections including a latch device whereby the operation of said actuating member may pull the gripper tail to close and retract the gripper, and means to unlatch said device to permit the restoring and opening of the gripper.

54. In a pulling-over mechanism, a gripper device comprising first and second jaws opposed to third and fourth jaws respectively, equalizing mechanism therefor, connections for first closing, then retracting, both pairs of jaws, and means for varying the action of said equalizing means to introduce a relative difference in the pulling-over action of the respective jaw-pairs.

55. In a pulling-over mechanism, a gripper device comprising first and second jaws opposed to third and fourth jaws respectively, the first and third jaws being connected to the second and fourth jaws, so that when pulled the gripper is closed and then retracted, equalizing mechanism associated with said jaws, adjustable resilient means arranged to influence said equalizing means to determine the relative pulling-over action of the respective jaw-pairs, and means for determining the adjustment of the resilient means at will.

56. In a pulling-over mechanism opposite side grippers each swingable bodily about an axis near a gripping edge and adjustable stops for determining the incline of the grippers.

57. In a pulling-over mechanism opposite side grippers, each swingable bodily about an axis near a gripping edge, a cross connection to cause the grippers to swing in unison and means to determine the operative position of the grippers when swung.

58. In a pulling-over mechanism, opposite side grippers, each swingable bodily about an axis near a gripping edge, a cross connection to cause the grippers to swing in unison, and symmetrical stops for the respective grippers for determining the reversed positions of both.

59. In a pulling-over mechanism, opposite side grippers, each swingable bodily about an axis near a gripping edge, a cross connection to cause the grippers to swing in unison, symmetrical stops for the respective grippers for determining the reversed positions of both, and means for adjusting said cross connection and said stops for symmetrically altering the reversed positions of both grippers.

60. In a lasting machine, a jack arm swingable about a transverse horizontal axis, a clamp frame comprised in said jack, and a shoe clamp in said frame arranged to clamp a shoe with its sole facing rearward and approximately in the same plane with, but above, said axis; said jack adapted in its final position to hold the shoe conveniently for wiping operations, and there being combined with said jack a pulling-over mechanism suitably located to operate at the initial position of the shoe held in the jack.

61. In a lasting machine, a jack arm swingable about a transverse horizontal axis, a clamp frame comprised in said jack, and a shoe clamp in said frame arranged to clamp a shoe with its sole facing rearward and approximately in the same plane with, but above, said axis, said jack arm adapted to swing through substantially a right angle to swing the shoe from substantially upright to substantially flatwise position; said jack adapted in its final position to hold the shoe conveniently for wiping operations, and there being combined with said jack a pulling-over mechanism suitably located to operate at the initial position of the shoe held in the jack.

62. In a lasting machine, a jack arm swingable about a transverse horizontal axis, a clamp frame comprised in said jack, and a shoe clamp in said frame arranged to clamp a shoe with its sole approximately in the same plane with, but removed from, said axis, said jack arm adapted to swing through substantially a right angle to swing the shoe from substantially upright to substantially flatwise position, and said frame being swingable on said jack arm about an axis substantially at right angles to said plane, whereby the shoe and clamp may be swung into and out of parallelism with said jack arm axis while remaining in the same plane; said jack adapted in its final position to hold the shoe conveniently for wiping operations, and there being combined with said jack a pulling-over mechanism suitably located to operate at the initial position of the shoe held in the jack.

63. In a lasting machine, a jack mechanism comprising a last spindle for engaging the shoe heel end, a clamp frame swingable in the jack about an axis coincident with said spindle, a clamp adjustable in said frame to suit variations in shoes, said clamp comprising a shoe upper engaging pad shiftable in the frame toward and from the shoe, and hooks reaching around to engage the shoe sole; said jack adapted in its final position to hold the shoe conveniently for wiping operations, and there being combined with said jack a pulling-over mechanism suitably located to operate at the initial position of the shoe held in the jack.

64. In a lasting machine, a jack mechanism comprising a last spindle for engaging the shoe heel end, a clamp frame swingable in the jack about an axis coincident with said spindle, a clamp adjustable in said frame to suit variations in shoes, and a bodily shiftable jack arm carrying all the herein recited elements; said jack adapted in its final position to hold the shoe conveniently for wiping operations, and there being combined with said jack a pulling-over mechanism suitably located to operate at the initial position of the shoe held in the jack.

65. In a lasting machine, a shiftable jack consisting of a shiftable arm and a shoe holding means, pulling-over mechanism operable in the initial position of the jack, and the jack in its final position adapted to hold the shoe conveniently for wiping operations, said shoe holding means comprising a clamp frame swingable on the jack arm to swing the shoe in the plane of its sole, a clamp carriage slidable in said frame toward and from its axis of swinging to position the clamp for different length shoes, and a shoe clamp bodily shiftable on said carriage, toward and from the shoe.

66. In a lasting machine, a shiftable jack consisting of a shiftable arm and a shoe holding means, said arm adapted to shift to carry the shoe from a substantially upright pulling-over position through substantially a right angle to a substantially flatwise inverted position, pulling-over mechanism operable in the initial position of the jack, and the jack in its final position adapted to hold the shoe conveniently for wiping operations, said shoe holding means comprising a clamp frame swingable on the jack arm, to swing the shoe in the plane of its sole, a clamp carriage slidable in said frame toward and from its axis of swinging to position the clamp for different length shoes, and a shoe clamp bodily shiftable on said carriage, toward and from the shoe.

67. In a lasting machine, a jack arm, a clamp frame swingable thereon, a clamp carriage slidable in said frame toward and from its axis, a clamp bodily shiftable in said carriage toward and from the shoe, and a single means to lock the carriage in the frame and to lock the clamp in the carriage; said jack adapted in its final position to hold the shoe conveniently for wiping operations, and there being combined with said jack a pulling over mechanism suitably located to operate at the initial position of the shoe held in the jack.

68. In a lasting machine, a jack comprising a shiftable frame, a shoe toe clamp, a carriage adjustable in said frame for adjusting the clamp in accordance with different lengths of shoes, a carrier for carrying said clamp bodily toward the shoe toe end, and means for supporting the shoe by its heel end; said jack adapted in its final position to hold the shoe conveniently for wiping operations, and there being combined with said jack a pulling-over mechanism suitably located to operate at the initial position of the shoe held in the jack.

69. In a lasting machine, a jack comprising a frame, a shoe clamp, a carrier for carrying said clamp bodily toward the shoe, said plunger having a sliding connection with the frame, and means for rigidly locking said clamp plunger in the frame; said jack adapted in its final position to hold the shoe conveniently for wiping operations, and there being combined with said jack a pulling-over mechanism suitably located to operate at the initial position of the shoe held in the jack.

70. In a lasting machine, a jack comprising a shiftable frame, a shoe toe clamp, a carriage adjustable in said frame for adjusting the clamp in accordance with different lengths of shoes, a carrier for carrying said clamp bodily toward the shoe, said plunger having a sliding connection with the carriage, means for rigidly locking said clamp plunger in the carriage, said clamp comprising shoe sole engaging hooks, means for applying and tightening said hooks against the shoe, and a single handle for shifting said plunger and operating said hook applying means; said jack adapted in its final position to hold the shoe conveniently for wiping operations and there being combined with said jack a pulling-over mechanism suitably located to operate at the initial position of the shoe held in the jack.

71. In a lasting machine, a shifting jack arm, a frame swingable thereon and a clamp on said frame, said jack arm and frame provided with coöperating stops to limit the swing of the frame; said jack adapted in its final position to hold the shoe conveniently for wiping operations, and there being combined with said jack a pulling-over mechanism suitably located to operate at the initial position of the shoe held in the jack.

72. In a lasting machine, a jack arm, a frame swingable thereon and a clamp on said frame, a spindle at the axis of frame swinging, a pintle carried eccentrically on said spindle for entering the shoe last recess, and means for causing the spindle to rotate with the swing of the frame; said jack adapted in its final position to hold the shoe conveniently for wiping operations, and there being combined with said jack a pulling-over mechanism suitably located to operate at the initial position of the shoe held in the jack.

73. In a lasting machine, shoe holding means, wiping mechanism, a carriage whereby said mechanism may be bodily symmetrically swung across the machine for right and left shoes said carriage and mechanism being between their axis of swinging and the shoe holding means, and means for rotating said mechanism on said carriage to present it at the proper angle to the shoe.

74. In a lasting machine, shoe holding means, wiping mechanism, a carriage whereby said mechanism may be bodily symmetrically swung across the machine for right and left shoes, the axis of swing of said carriage being located at a distance from the shoe location, and means for rotating said mechanism to correct its line of wiping action.

75. In a lasting machine, shoe holding means, wiping mechanism, a carriage whereby said mechanism may be bodily symmetrically swung across the machine for right and left shoes, the axis of swing of said carriage being located at a distance from the shoe location, and means for rotating said mechanism to correct its line of wiping action, said rotating means being operable by a loose connection.

76. In a lasting machine, shoe holding means, wiping mechanism, a carriage whereby said mechanism may be bodily symmetrically swung across the machine for right and left shoes, said carriage and mechanism being between their axis of swinging and the shoe holding means, means for rotating said mechanism on said carriage to present it at the proper angle to the shoe, and a single handle having different connections for successively causing said swinging and rotating movements.

77. In a lasting machine, a wiping mechanism, a support therefor, a shoe support, one of said supports being movable toward and from the other, and a loose connection, permitting free movement as the movable support is set toward or from the other, said connection adapted to lock the movable support in position with the wiping mechanism in operative relation to the shoe.

78. In a lasting machine, a wiping mechanism, a support therefor, a shoe support, one of said supports being movable toward and from the other, a loose connection, permitting free movement as the movable support is set toward or from the other, said connection adapted to lock the movable support in position with the wiping mechanism in operative relation to the shoe, and an adjustment device for finer determination of position.

79. In a lasting machine, a shoe support, a swinging support for a wiping mechanism adapted to shift toward and from the shoe, a swinging arm between the supports, a loose link connection between the arm and one support, and a fine adjustment connection between the arm and the other support.

80. In a lasting machine, a shoe support, a wiping mechanism, a carriage below and supporting said mechanism fitted for bodily adjustment toward and from the shoe, and a platform below and supporting the carriage fitted for longitudinal tilting adjustment, whereby the adjustment toward and from the shoe is along the incline determined by the tilting adjustment.

In testimony whereof, I have affixed my signature hereto.

ANGELO PERRI.